US009877002B2

(12) United States Patent
Kim et al.

(10) Patent No.: US 9,877,002 B2
(45) Date of Patent: Jan. 23, 2018

(54) RECONFIGURABLE MOBILE DEVICE

(71) Applicant: Samsung Electronics Co., Ltd., Suwon-si, Gyeonggi-do (KR)

(72) Inventors: Sang-ho Kim, Hwaseong-si (KR); Seung-jin Oh, Seoul (KR); Sang-wook Kwon, Seongnam-si (KR); Byung-jik Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/217,517

(22) Filed: Jul. 22, 2016

(65) Prior Publication Data
US 2017/0099471 A1 Apr. 6, 2017

Related U.S. Application Data

(60) Provisional application No. 62/236,552, filed on Oct. 2, 2015.

(30) Foreign Application Priority Data

Feb. 4, 2016 (KR) ........................ 10-2016-0013916

(51) Int. Cl.
*G03B 21/56* (2006.01)
*G03B 21/14* (2006.01)
*H04N 9/31* (2006.01)
*G06F 3/041* (2006.01)
*G03B 21/58* (2014.01)

(52) U.S. Cl.
CPC ........... *H04N 9/3173* (2013.01); *G03B 21/56* (2013.01); *G03B 21/58* (2013.01); *G06F 3/0412* (2013.01)

(58) Field of Classification Search
CPC ................................ G03B 21/56; G03B 21/58
USPC ............................................ 359/461; 353/79
See application file for complete search history.

(56) References Cited

U.S. PATENT DOCUMENTS

| | | | | | |
|---|---|---|---|---|---|
| 5,523,880 | A | * | 6/1996 | Pidgeon | ................. G03B 21/58 355/74 |
| 6,637,896 | B2 | * | 10/2003 | Li | ......................... G03B 21/10 353/119 |
| 7,027,110 | B2 | | 4/2006 | Akiyama et al. | |
| 7,242,445 | B2 | | 7/2007 | Akiyama et al. | |

(Continued)

FOREIGN PATENT DOCUMENTS

| | | |
|---|---|---|
| JP | 2004-279867 A | 10/2004 |
| KR | 10-2008-0059029 A | 6/2008 |
| KR | 20-2013-0002708 U | 5/2013 |

*Primary Examiner* — William C Dowling
(74) *Attorney, Agent, or Firm* — Jefferson IP Law, LLP

(57) ABSTRACT

A reconfigurable mobile device is provided. The reconfigurable mobile device includes a first body, a second body that is disposed at a side of the first body and is movable with respect to the first body, a multistage supporter that is provided between the first body and the second body and comprises at least two supporting members that are inserted and received in at least one of the first body and the second body according to movement of the first body and the second body, a screen that is provided in the multistage supporter and is wound or unwound according to the movement of the first body and the second body, and a projector that is provided in at least one of the first body and the second body and configured to project an image toward the screen.

20 Claims, 35 Drawing Sheets

(56) References Cited

U.S. PATENT DOCUMENTS

| | | | |
|---|---|---|---|
| 7,602,549 B2* | 10/2009 | Yamauchi | G03B 21/56 359/449 |
| 8,159,745 B2* | 4/2012 | Abe | G03B 21/58 359/443 |
| 8,830,577 B2* | 9/2014 | Hajjar | G03B 21/58 345/84 |
| 9,019,313 B2* | 4/2015 | Kwack | G06F 1/1652 345/173 |
| 2004/0183958 A1 | 9/2004 | Akiyama et al. | |
| 2006/0080918 A1* | 4/2006 | Clubbe | F16M 11/16 52/238.1 |
| 2006/0125973 A1 | 6/2006 | Akiyama et al. | |
| 2010/0167791 A1 | 7/2010 | Lim | |
| 2013/0058063 A1 | 3/2013 | O'Brien | |
| 2015/0277220 A1* | 10/2015 | Durkee | G03B 21/58 359/461 |

* cited by examiner

1

RECONFIGURABLE MOBILE DEVICE

CROSS-REFERENCE TO RELATED APPLICATION(S)

This application claims the benefit under 35 U.S.C. § 119(e) of a U.S. Provisional application filed on Oct. 2, 2015 in the U.S. Patent and Trademark Office and assigned Ser. No. 62/236,552, and under 35 U.S.C. § 119(a) of a Korean patent application filed on Feb. 4, 2016 in the Korean Intellectual Property Office and assigned serial number 10-2016-0013916, the entire disclosure of each of which is hereby incorporated by reference.

TECHNICAL FIELD

The present disclosure relates to a mobile device. More particularly, the present disclosure relates to a reconfigurable mobile device that can freely adjust a size of a display thereof.

BACKGROUND

Recently, consumption of stream content, such as video on demand (VOD), cloud game, etc., is increasing. Also, in the social network service (SNS), the use of images and videos is being gradually increased as compared to text. According to a change in the consumption patterns of content, a size of a display of mobile devices such as smart phones is growing to more than 5 inches. Similarly reflecting this trend, phablets having a display size of more than 6 inches have also appeared.

Since the full size of the mobile device having the large size screen is much larger, ease of portability of the mobile device has decreased. To address this problem, a technique of reducing the full size of the mobile device by reducing areas of a bezel and surrounding parts other than a liquid crystal display (LCD) has been developed. However, this technique has a limit in which the full size of the mobile device cannot be reduced less than the size of the LCD.

To address the problem, a flexible LCD that can be folded or wrapped is being developed. However, since, when folding the flexible LCD, a folded portion of the flexible LCD needs to have a large radius due to the technical limitations of the flexible LCD, it is difficult to reduce the thickness of the mobile device.

Accordingly, development of a mobile device having a large screen that is advantageous when in use and having a size that can be reduced to a minimum for transportation is desired.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a reconfigurable mobile device, a screen of which can be extended in use so that a size of the screen is a maximum, and the screen of which can be folded in carrying so that the size of the screen is a minimum.

In accordance with an aspect of the present disclosure, a reconfigurable mobile device is provided. The reconfigurable mobile device includes a first body, a second body that is disposed at a side of the first body and is movable with respect to the first body, a multistage supporter that is provided between the first body and the second body and comprises at least two supporting members that are inserted and received in at least one of the first body and the second body according to movement of the first body and the second body, a screen that is provided in the multistage supporter and is wound or unwound according to the movement of the first body and the second body, and a projector that is provided in at least one of the first body and the second body and projects an image toward the screen.

Half of the at least two supporting members constituting the multistage supporter may be inserted in the first body, and the other half may be inserted in the second body.

When a side surface of the first body and a side surface of the second body are in contact with each other, the multistage supporter and the screen may be not exposed to an outside, and when the first body is separated from the second body, the multistage supporter and the screen may be exposed to the outside.

The projector may be disposed above the screen.

The projector may include a first projector to project an image onto a first portion of the screen, and a second projector to project an image onto a second portion of the screen.

The projector may be disposed below the screen.

The first body may be provided with a screen winding portion in which the screen is received in a wound state.

The first body may be provided with a first screen winding portion in which half of the screen is wound and received, and the second body may be provided with a second screen winding portion in which the remaining half of the screen is wound and received.

The screen may include a support layer, a reflective layer, a tint layer, and an anti-reflective layer that are sequentially laminated.

The reflective layer may include a plurality of inclined surfaces to reflect light projected from the projector.

The screen may include a prism protective layer, a prism layer, a support layer, a tint layer, and an anti-reflective layer that are sequentially laminated.

The projector may include a projecting portion to project light, and a reflective member to reflect the light coming out from the projecting portion to the screen.

The reflective member may include an aspherical mirror.

The screen may include a touch sensing layer.

The touch sensing layer may include a transmission (Tx) electrode corresponding to a middle area of the screen, and four reception (Rx) electrodes provided in four sides of the Tx electrode.

The Tx electrode and the Rx electrodes may be provided on a same side.

The touch sensing layer may include an Rx electrode provided in a middle of the Tx electrode.

A left Rx electrode of the touch sensing layer may be disposed in the first body, and a right Rx electrode may be disposed in the second body.

In accordance with another aspect of the present disclosure, a reconfigurable mobile device is provided. The reconfigurable mobile device includes a controller configured to adjust a size of the image that is projected by the projector according to a size of the screen that is exposed between the first body and the second body.

The screen may include a prism protective layer, a prism layer, a support layer, and one of an aerial image (AI) plate layer, a lenticular layer, and a parallax barrier layer that are sequentially laminated.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "first," "second," etc. may be used to describe diverse components, but the components are not limited by the terms. The terms are only used to distinguish one component from the others.

In the following disclosure, the terms "include" and "consist of" designate the presence of features, numbers, steps, operations, components, elements, or a combination thereof that are written in the specification, but do not exclude the presence or possibility of addition of one or more other features, numbers, steps, operations, components, elements, or a combination thereof.

Figure 1A:
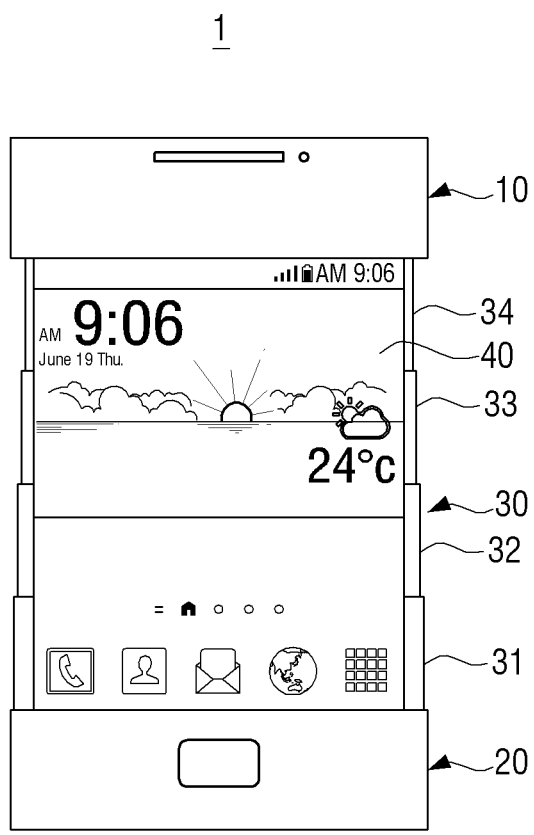
FIG. 1A is a view illustrating a reconfigurable mobile device according to an embodiment of the present disclosure.
Figure 1B:
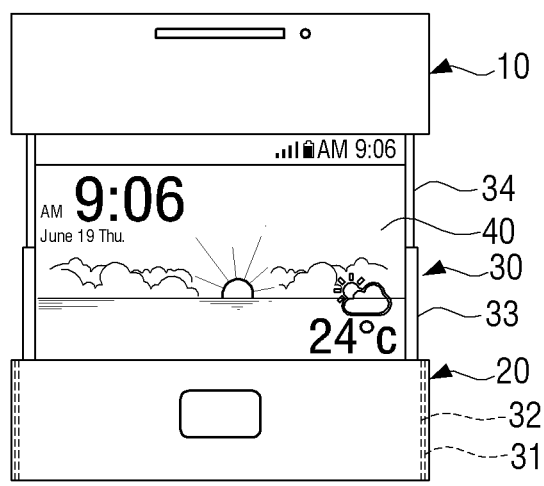
FIG. 1B is a view illustrating the reconfigurable mobile device of FIG. 1A when a screen thereof is folded to be visible half according to an embodiment of the present disclosure.
Figure 1C:
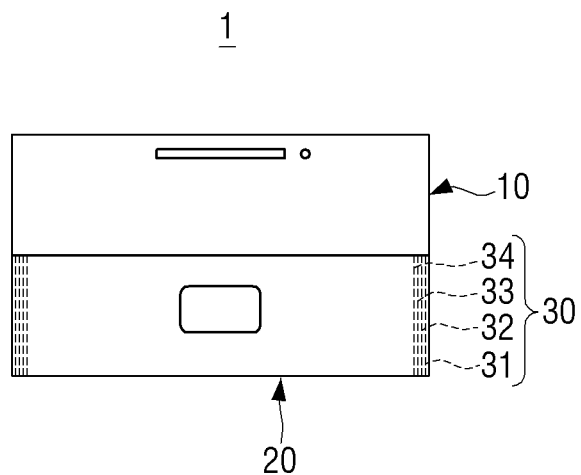
FIG. 1C is a view illustrating the reconfigurable mobile device of FIG. 1A when a screen thereof is completely folded according to an embodiment of the present disclosure.
Figure 2A:
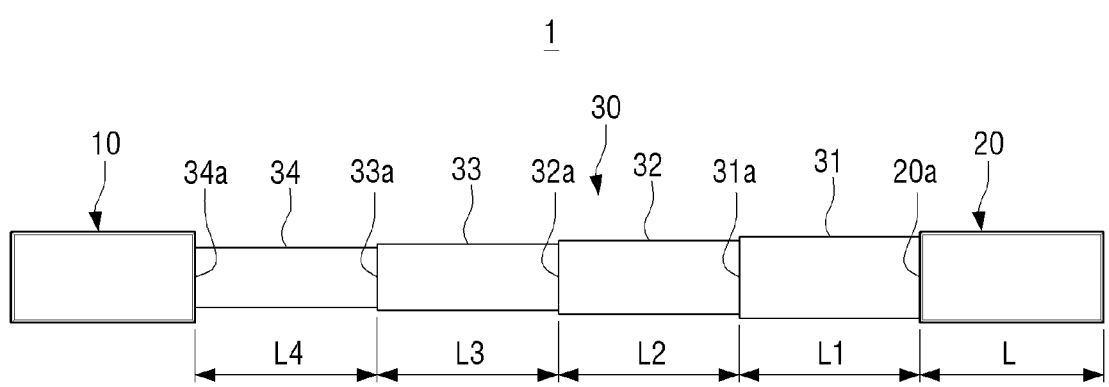
FIG. 2A is a side view illustrating the reconfigurable mobile device of FIG. 1A according to an embodiment of the present disclosure.
Figure 2B:
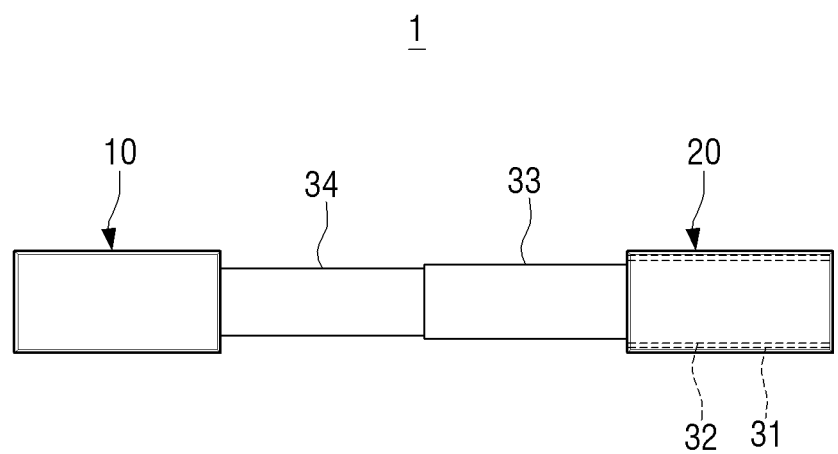
FIG. 2B is a side view illustrating the reconfigurable mobile device of FIG. 2A when one end of the reconfigurable mobile device is partially folded according to an embodiment of the present disclosure.
Figure 2C:
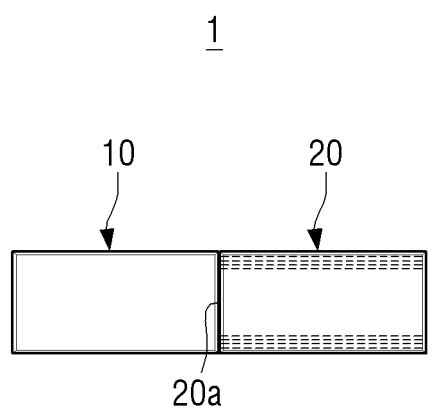
FIG. 2C is a side view illustrating the reconfigurable mobile device of FIG. 2A being completely folded according to an embodiment of the present disclosure.

FIG. 1A is a view illustrating a reconfigurable mobile device according to an embodiment of the present disclosure. FIG. 1B is a view illustrating the reconfigurable mobile device of FIG. 1A when a screen thereof is folded to be visible half according to an embodiment of the present disclosure. FIG. 1C is a view illustrating the reconfigurable mobile device of FIG. 1A when a screen thereof is completely folded according to an embodiment of the present disclosure. FIG. 2A is a side view illustrating the reconfigurable mobile device of FIG. 1A according to an embodiment of the present disclosure. FIG. 2B is a side view illustrating the reconfigurable mobile device of FIG. 2A when one end of the reconfigurable mobile device is partially folded according to an embodiment of the present disclosure. FIG. 2C is a side view illustrating the reconfigurable mobile device of FIG. 2A being completely folded according to an embodiment of the present disclosure.

Referring to FIGS. 1A to 1C and 2A to 2C, a reconfigurable mobile device 1 according to an embodiment of the present disclosure may include a first body 10, a second body 20, a multistage supporter 30, and a screen 40.

The first body 10 and the second body 20 form a portion of an appearance of the reconfigurable mobile device 1. In other words, the first body 10 forms one end portion of the reconfigurable mobile device 1, and the second body 20 forms the other end portion of the reconfigurable mobile device 1. In more detail, the second body 20 is disposed at a side of the first body 10, and is movable with respect to the first body 10. Accordingly, when the reconfigurable mobile device 1 is in the folded state, only the first body 10 and the second body 20 are exposed to the outside.

The multistage supporter 30 is provided between the first body 10 and the second body 20, and includes at least two supporting members that can be overlappingly inserted and accommodated inside at least one of the first body 10 and the second body 20 according to the movement of the first body 10 and the second body 20.

For example, referring to FIG. 2A, the multistage supporter 30 may include a first supporting member 31 that can be inserted into or extended from the inside of the second body 20, a second supporting member 32 that can be inserted into or extended from the inside of the first supporting member 31, a third supporting member 33 that can be inserted into or extended from the inside of second supporting member 32, and a fourth supporting member 34 that can be inserted into or extended from the inside of the third supporting member 33.

The first supporting member 31 is formed to have a length L1 that is shorter than a length L of the second body 20. When the first supporting member 31 is completely inserted into the second body 20, the first supporting member 31 is not exposed to the outside of the second body 20. Also, since an inner end of the first supporting member 31 is formed to be hooked on an end of the second body 20, when pulling out and extending the first supporting member 31 from the second body 20, the first supporting member 31 is not separated from the second body 20. In the present embodiment, the first supporting member 31 is formed so that when the first supporting member 31 is completely inserted into the second body 20, an outer end 31a of the first supporting member 31 is aligned with the end 20a of the second body 20.

The second supporting member 32 is formed to have a length L2 that is the same as or shorter than the length L1 of the first supporting member 31. When the second supporting member 32 is completely inserted into the first supporting member 31, the second supporting member 32 is not exposed to the outside of the first supporting member 31. Accordingly, when the first supporting member 31 is completely inserted into the second body 20, the second supporting member 32 also is not exposed to the outside of the second body 20. Since an inner end of the second supporting member 32 is formed to be hooked on the outer end 31a of the first supporting member 31, when pulling out and extending the second supporting member 32 from the first supporting member 31, the second supporting member 32 is not separated from the first supporting member 31. In the present embodiment, the second supporting member 32 is formed so that when the second supporting member 32 is completely inserted into the first supporting member 31, an outer end 32a of the second supporting member 32 is aligned with the outer end 31a of the first supporting member 31. Accordingly, when the first supporting member 31 is completely inserted into the second body 20 and the second supporting member 32 is completely inserted into the first supporting member 31, the outer end 32a of the second supporting member 32 is aligned with the end 20a of the second body 20. As illustrated in FIG. 2B, when the first supporting member 31 and the second supporting member 32 are completely inserted into the second body 20, only the third supporting member 33 and the fourth supporting member 34 are exposed between the first body 10 and the second body 20.

The third supporting member 33 is formed to have a length L3 that is the same as or shorter than the length L2 of the second supporting member 32. When the third supporting member 33 is completely inserted into the second supporting member 32, the third supporting member 33 is not exposed to the outside of the second supporting member 32. Accordingly, when the second supporting member 32 is completely inserted into the second body 20, the third supporting member 33 also is not exposed to the outside of the second body 20. Since an inner end of the third supporting member 33 is formed to be hooked on the outer end 32a of the second supporting member 32, when pulling out and extending the third supporting member 33 from the second supporting member 32, the third supporting member 33 is not separated from the second supporting member 32. In the present embodiment, the third supporting member 33 is formed so that when the third supporting member 33 is completely inserted into the second supporting member 32, an outer end 33a of the third supporting member 33 is aligned with the outer end 32a of the second supporting member 32. Accordingly, when the first supporting member 31 is completely inserted into the second body 20, the second supporting member 32 is completely inserted into the first supporting member 31, and the third supporting member 33 is completely inserted into the second supporting member 32, the outer end 33a of the third supporting member 33 is aligned with the end 20a of the second body 20.

The fourth supporting member 34 is formed to have a length L4 that is the same as or shorter than the length L3 of the third supporting member 33. When the fourth supporting member 34 is completely inserted into the third supporting member 33, the fourth supporting member 34 is not exposed to the outside of the third supporting member 33. Accordingly, when the third supporting member 33 is completely inserted into the second body 20, the fourth supporting member 34 also is not exposed to the outside of the second body 20. Since an inner end of the fourth supporting member 34 is formed to be hooked on the outer end 33a of the third supporting member 33, when pulling out and extending the fourth supporting member 34 from the third supporting member 33, the fourth supporting member 34 is not separated from the third supporting member 33. In the present embodiment, the fourth supporting member 34 is formed so that when the fourth supporting member 34 is completely inserted into the third supporting member 33, an outer end 34a of the fourth supporting member 34 is aligned with the outer end 33a of the third supporting member 33. Accordingly, as illustrated in FIG. 2C, when the first supporting member 31 is completely inserted into the second body 20, the second supporting member 32 is completely inserted into the first supporting member 31, the third supporting member 33 is completely inserted into the second supporting member 32, and the fourth supporting member 34 is completely inserted into the third supporting member 33, the outer end 34a of the fourth supporting member 34 is aligned with the end 20a of the second body 20.

The second body 20 is formed in a shape of a substantially rectangular parallelepiped container, and is provided with an open side which the first supporting member 31 is inserted into and pulled out from. The outer end 34a of the fourth supporting member 34 is fixed to the first body 10. Accordingly, as illustrated in FIG. 2C, when all the first, second, third, and fourth supporting members 31, 32, 33, and 34 are inserted into the second body 20, the one side surface of the second body 20 and the one side surface of the first body 10 are in contact with each other. In this case, as illustrated in FIG. 1C, the screen 40 and the multistage supporter 30 are not exposed to the outside.

In the reconfigurable mobile device 1 according to an embodiment of the present disclosure having the multistage supporter 30, when the multistage supporter 30 is fully extended as illustrated in FIG. 1A, the size of the screen 40 is increased to the maximum, and when the multistage supporter 30 is contracted to be invisible as illustrated in FIG. 1C, the screen 40 is not exposed.

The multistage supporter 30 may be formed to be manually or automatically extended or contracted. If the first, second, third, and fourth supporting members 31, 32, 33, and 34 of the multistage supporter 30 are configured to be automatically moved, a drive unit 91 (see FIG. 7) including a motor may be disposed in the inside of the first body 10 or the second body 20.

The first, second, third, and fourth supporting members 31, 32, 33, and 34 constituting the multistage supporter 30 are configured to have an open top surface so that the screen 40 provided inside the first, second, third, and fourth supporting members 31, 32, 33, and 34 is exposed.

In the above description, all the first, second, third, and fourth supporting members 31, 32, 33, and 34 constituting the multistage supporter 30 are inserted and received in the inside of the second body 20. However, the structure of the multistage supporter 30 is not limited thereto. The multistage supporter 30 may be formed so that some supporting members of the multistage supporter 30 are received in the first body 10 and the rest of the supporting members are received in the second body 20.

Hereinafter, a reconfigurable mobile device provided with a multistage supporter having a different structure will be described with reference to FIGS. 3A to 3D.

Figure 3A:
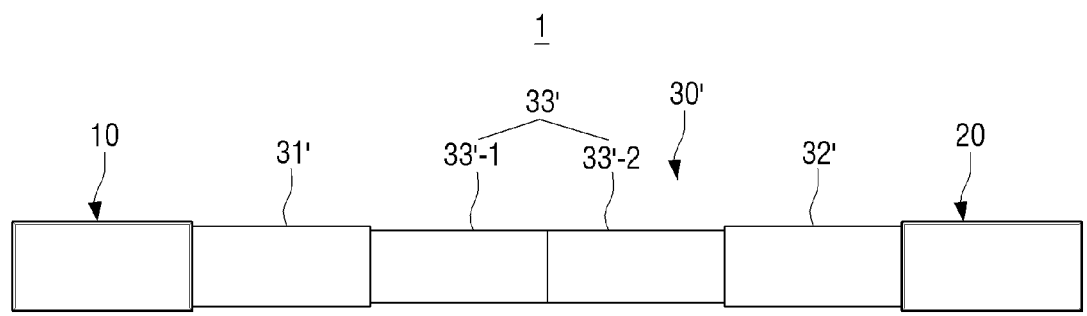
FIG. 3A is a side view illustrating a reconfigurable mobile device according to an embodiment of the present disclosure.
Figure 3B:
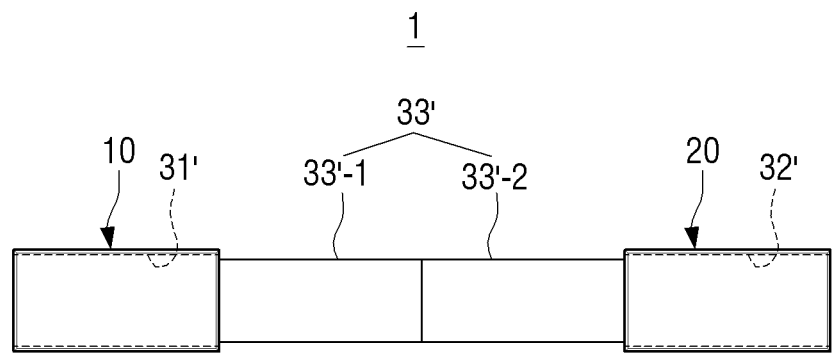
FIG. 3B is a side view illustrating the reconfigurable mobile device of FIG. 3A when opposite ends of the reconfigurable mobile device are partially folded according to an embodiment of the present disclosure.
Figure 3C:
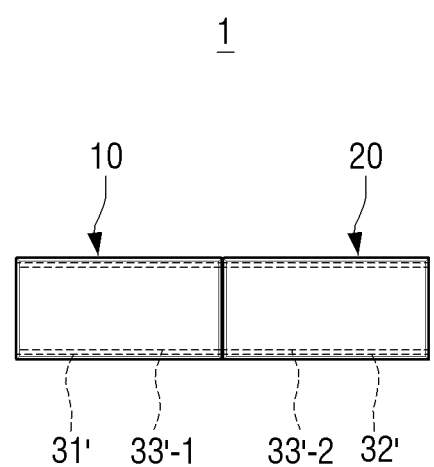
FIG. 3C is a side view illustrating the reconfigurable mobile device of FIG. 3A being completely folded according to an embodiment of the present disclosure.
Figure 3D:
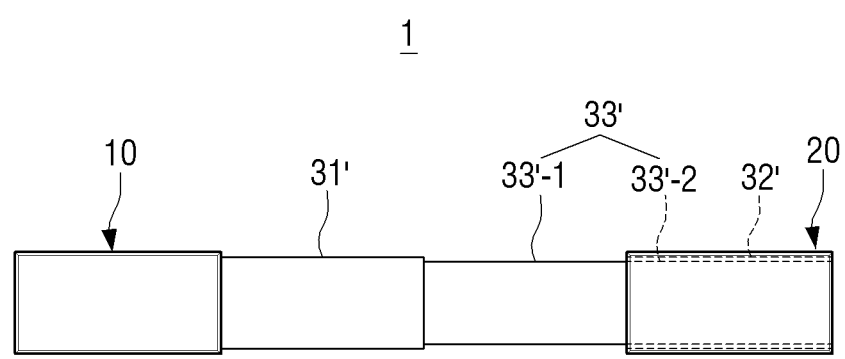
FIG. 3D is a side view illustrating the reconfigurable mobile device of FIG. 3A when one end of the reconfigurable mobile device is folded according to an embodiment of the present disclosure.

FIG. 3A is a side view illustrating a reconfigurable mobile device according to an embodiment of the present disclosure. FIG. 3B is a side view illustrating the reconfigurable mobile device of FIG. 3A when opposite ends of the reconfigurable mobile device is partially folded according to an embodiment of the present disclosure. FIG. 3C is a side view illustrating the reconfigurable mobile device of FIG. 3A being completely folded according to an embodiment of the present disclosure. FIG. 3D is a side view illustrating the reconfigurable mobile device of FIG. 3A when an end of the reconfigurable mobile device is folded half according to an embodiment of the present disclosure.

Referring to FIG. 3A, a multistage supporter 30' of the reconfigurable mobile device 1 is provided between the first body 10 and the second body 20. The multistage supporter 30' includes a left supporting member 31' that can be inserted into or extended from the inside of the first body 10, a right supporting member 32' that can be inserted into or extended from the inside of the second body 20, and a middle supporting member 33' that can be received in both the left supporting member 31' and the right supporting member 32'.

The left supporting member 31' is formed to have a length shorter than the length of the first body 10. When the left supporting member 31' is completely inserted into the first body 10, the left supporting member 31' is not exposed to the outside of the first body 10. Also, since an inner end of the left supporting member 31' is formed to be hooked on one end of the first body 10, when the left supporting member 31' is extended from the first body 10, the left supporting member 31' is not separated from the first body 10. In the present embodiment, the left supporting member 31' is formed so that when the left supporting member 31' is completely inserted into the first body 10, an outer end of the left supporting member 31' is aligned with the one end of the first body 10.

The right supporting member 32' is formed to have a length shorter than the length of the second body 20. When the right supporting member 32' is completely inserted into the second body 20, the right supporting member 32' is not exposed to the outside of the second body 20. Also, since an inner end of the right supporting member 32' is formed to be hooked on one end of the second body 10, when the right supporting member 32' is extended from the second body 20, the right supporting member 32' is not separated from the second body 20. In the present embodiment, the right supporting member 32' is formed so that when the right supporting member 32' is completely inserted into the second body 20, an outer end of the right supporting member 32' is aligned with the one end of the second body 20.

The middle supporting member 33' is formed so that a portion of the middle supporting member 33' is inserted into the left supporting member 31' and the rest portion of the middle supporting member 33' is inserted into the right supporting member 32'. In more detail, the left half 33'-1 of the middle supporting member 33' is inserted into the left supporting member 31' and the right half 33'-2 of the middle supporting member 33' is inserted into the right supporting member 32'. When the middle supporting member 33' is inserted into the left and right supporting members 31' and 32', the one side surface of the first body 10 and the one side surface of the second body 20 are in contact with each other.

Accordingly, when the left supporting member 31', the right supporting member 32', and the middle supporting member 33' constituting the multistage supporter 30' are fully extended as illustrated in FIG. 3A, the screen 40 may be exposed in the maximum size.

When the left supporting member 31' of the multistage supporter 30' is inserted into the first body 10 and the right supporting member 32' is inserted into the second body 20, the screen 40 may be exposed in a half size as illustrated in FIG. 3B.

When the left supporting member 31' of the multistage supporter 30' is inserted into the first body 10, the left half 33'-1 of the middle supporting member 33' is inserted into the left supporting member 31', the right supporting member 32' is inserted into the second body 20, and the right half 33'-2 of the middle supporting member 33' is inserted into the right supporting member 32', the first body 10 and the second body 20 are in contact with each other so that the screen 40 is not exposed to the outside as illustrated in FIG. 3C.

Further, when the left supporting member 31' of the multistage supporter 30' is inserted into the first body 10 and the left half 33'-1 of the middle supporting member 33' is inserted into the left supporting member 31', only a half of the screen 40 may be exposed as illustrated in FIG. 3D.

The left supporting member 31', the middle supporting member 33', and the right supporting member 32' are formed to have an open top surface so that the screen 40 provided inside the left supporting member 31', the middle supporting member 33', and the right supporting member 32' is exposed.

The screen 40 is a place where an image projected by projectors that will be described below is displayed. The screen 40 is disposed to be exposed to the outside or to be received in the inside of the first body 10 and the second body 20 in accordance with the movement of the first body 10 and the second body 20. For example, the first body 10 may be provided with a first screen winding portion in which half of the screen 40 is wound, and the second body 20 may be provided with a second screen winding portion in which the other half of the screen 40 is wound. Accordingly, when the multistage supporter 30 is extended so that the first body 10 is away from the second body 20, the screen 40 wound in the first and second screen winding portions is unwound to be exposed through the open top surface of the multistage supporter 30 between the first body 10 and the second body 20. When the multistage supporter 30 is completely extended, that is, when the first, second, third, and fourth supporting members 31, 32, 33, and 34 are fully extended, the screen 40 is exposed to the maximum. As this time, the screen 40 is supported by a lower portion of the multistage supporter 30.

When the multistage supporter 30 starts to be contracted so that first body 10 approaches the second body 20, the opposite ends of the screen 40 starts to be wound in first and second screen winding portions. As illustrated in FIG. 2C, when the multistage supporter 30 is completely contracted, that is, when the first, second, third, and fourth supporting members 31, 32, 33, and 34 are completely overlapped, the multistage supporter 30 is located inside the second body 20 and the first body 10 is in contact with the second body 20 so that the screen 40 is not exposed to the outside. At this time, most of the screen 40 is received in the first and second screen winding portions. The first and second screen winding portions may be formed to automatically wind or unwind the screen 40 in accordance with the contraction and extension of the multistage supporter 30.

Hereinafter, arrangement of the screen 40 and the projectors of the reconfigurable mobile device 1 according to an embodiment of the present disclosure will be described in more detail with reference to FIGS. 4 and 5.

Figure 4:
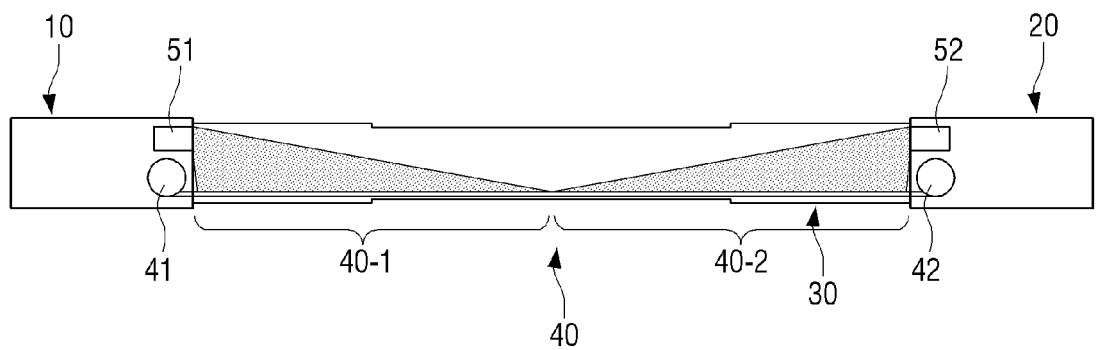
FIG. 4 is a cross-sectional view schematically illustrating a reconfigurable mobile device according to an embodiment of the present disclosure.
Figure 5:
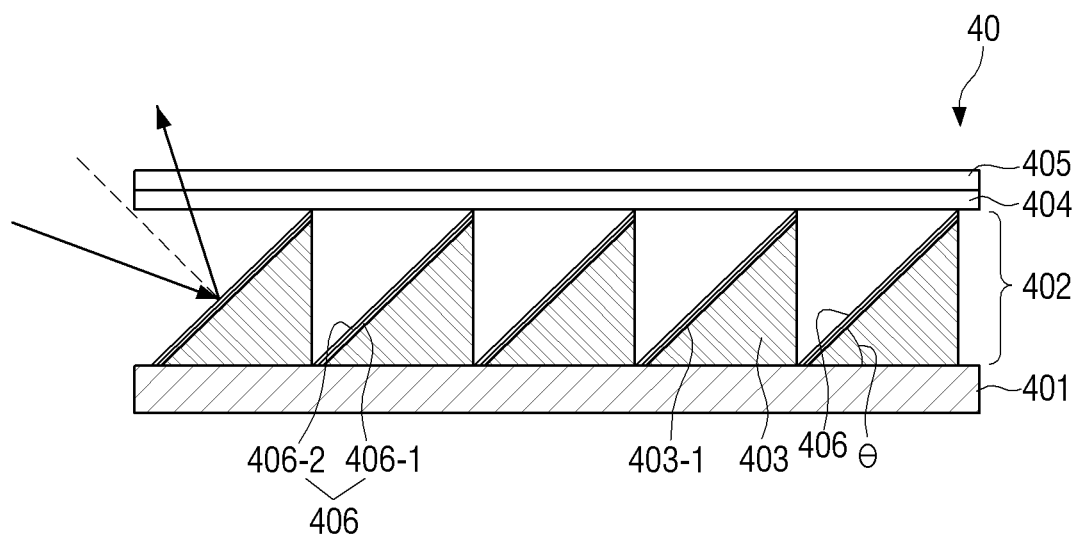
FIG. 5 is a partial cross-sectional view illustrating a structure of a screen which is used in the reconfigurable mobile device of FIG. 4 according to an embodiment of the present disclosure.

FIG. 4 is a cross-sectional view schematically illustrating a reconfigurable mobile device according to an embodiment of the present disclosure, and FIG. 5 is a partial cross-sectional view illustrating a structure of a screen which is used in the reconfigurable mobile device of FIG. 4 according to an embodiment of the present disclosure.

Referring to FIG. 4, the screen 40 is disposed on the top surface of the lower portion of the multistage supporter 30 and is supported by the multistage supporter 30. A first screen winding portion 41 and a second screen winding portion 42 are provided in the left and the right of the screen 40. The first screen winding portion 41 is provided inside the first body 10, and the second screen winding portion 42 is provided inside the second body 20.

A first projector 51 is provided above one end of the screen 40, and a second projector 52 is provided above the other end of the screen 40. In more detail, the first projector 51 is provided in the first body 10 to project an image onto a left half 40-1 of the fully extended screen 40, and the second projector 52 is provided in the second body 20 to project an image onto a right half 40-2 of the fully extended screen 40.

The first projector 51 has a short focal length to focus the image on the screen 40 in a state where the first projector 51 is spaced apart by a distance less than the thickness of the first body 10 from the screen 40. Since the second projector 52 has the same function as the first projector 51 except that the second projector 52 is disposed in the second body 20 and projects the image onto the right half 40-2 of the screen 40, the second projector 52 has a short focal length like the first projector 51. Also, if two projectors 51 and 52 project the image dividing the screen 40 into two areas based on the center line of the screen 40 as the present embodiment, the projection area and the focal length to the screen 40 of each of the projectors 51 and 52 may be reduced so that it is possible to downsize the projectors 51 and 52.

When the first projector 51 projects an image toward the top surface of the screen 40 from the upper left of the screen 40, the screen 40 reflects the projected image toward the top portion of the multistage supporter 30, that is, the front side of the reconfigurable mobile device 1. When the second projector 52 projects an image toward the top surface of the screen 40 from the upper right of the screen 40, the screen 40 reflects the projected image toward the top portion of the multistage supporter 30, that is, the front side of the reconfigurable mobile device 1. Accordingly, the screen 40 is formed to reflect the incident image from the first and second projectors 51 and 52 toward the front side.

Hereinafter, the structure of the screen 40 will be described in more detail with reference to FIG. 5.

Referring to FIG. 5, the screen 40 may include a support layer 401, a reflective layer 402, a tint layer 404, and an anti-reflective layer 405.

The support layer 401 is formed to support the reflective layer 402. The support layer 401 may be formed of a polyethylene terephthalate (PET) film As another example, the support layer 401 may be formed as a silicon envelope that is formed by two overlapped silicon films and is provided with electro-rheological fluid received between the two silicon films. In this case, when a predetermined voltage is applied to the support layer 401, the silicon envelope is hardened so that the stiffness of the support layer 401 may be selectively controlled.

The reflective layer 402 is provided on the top surface of the support layer 401, and is formed to reflect the projected image from the first projector 51 and the second projector 52 toward the front side of the reconfigurable mobile device 1. In more detail, the reflective layer 402 includes a plurality of reflective protrusions 403 arranged parallel to one another. Each of the plurality of reflective protrusions 403 is substantially formed in a triangular pole shape having a cross section of a right-angled triangle, and is disposed so that an inclined surface 403-1 thereof faces the first projector 51 or the second body 20. For example, the plurality of reflective protrusions 403 of the reflective layer 402 corresponding to the left half of the screen 40 is formed such that the inclined surfaces 403-1 face the first projector 51, and the plurality of reflective protrusions 403 of the reflective layer 402 corresponding to the right half of the screen 40 is formed such that the inclined surfaces 403-1 face the second projector 52. Also, the inclined surface 403-1 of the reflective protrusions 403 may be formed to have an angle θ corresponding to the incident angle, thereby reflecting the incident light toward the front side of the reconfigurable mobile device 1.

The inclined surfaces 403-1 of the plurality of reflective protrusions 403 of the reflective layer 402 may be formed to have a scattering layer 406 that causes the reflected light to be scattered at a predetermined angle range. The scattering layer 406 may be configured of a silver layer 406-1 and an oxidation-preventing layer 406-2. The silver layer 406-1 is coated on the inclined surfaces 403-1 of the reflective protrusions 403, and the oxidation-preventing layer 406-2 is coated on the silver layer 406-1. In other words, the silver layer 406-1 and the oxidation-preventing layer 406-2 are formed in a structure laminated in layers. The silver layer 406-1 may be formed of silver, and the oxidation-preventing layer 406-2 may be formed of $SiO_2$. As another example, the scattering layer 406 may be formed of aluminum. In this case, it is not necessary to form the oxidation-preventing layer 406-2.

The tint layer 404 is formed on the reflective layer 402 to diffuse the reflected light reflected in the reflective layer 402. The tint layer 404 may be formed by coating a material that can diffuse the reflected light on the top surface of the reflective layer 402.

The anti-reflective layer 405 is formed to block external light from being reflected on the screen 40. Accordingly, the anti-reflective layer 405 may prevent the image, which is projected by the first and second projectors 51 and 52 and is reflected by the reflective layer 402, from not being seen due to the reflection of the external light.

The support layer 401, the reflective layer 402, the tint layer 404, and the anti-reflective layer 405 as described above may be laminated in sequence, thereby forming the screen 40.

In the above description, the reconfigurable mobile device 1 includes two projectors 51 and 52. However, the reconfigurable mobile device 1 may be configured to include one projector 53 as illustrated in FIG. 6.

Figure 6:
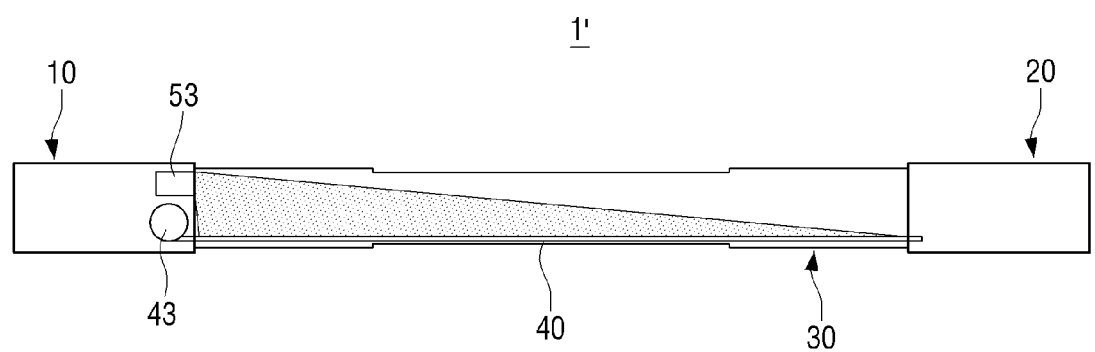
FIG. 6 is a cross-sectional view schematically illustrating a reconfigurable mobile device according to an embodiment of the present disclosure.

FIG. 6 is a cross-sectional view schematically illustrating a reconfigurable mobile device according to an embodiment of the present disclosure.

Referring to FIG. 6, the projector 53 is disposed above a screen winding portion 43 inside the first body 10. At this time, the projector 53 is formed to project an image on the entire area of the screen 40 of the reconfigurable mobile device 1' when the screen 40 is fully unfolded.

The screen winding portion 43 is disposed below the projector 53 inside the first body 10, and is formed to wind or unwind the screen 40 in accordance with the contraction and extension of the multistage supporter 30 provided between the first body 10 and the second body 20.

The first body 10, the second body 20, the multistage supporter 30, and the screen 40 of the reconfigurable mobile device 1' as illustrated in FIG. 6 are the same as those of the reconfigurable mobile device 1 as described above; therefore, detailed description thereof is omitted.

A controller may be formed to control the reconfigurable mobile device 1.

Hereinafter, a controller of the reconfigurable mobile device will be described in more detail with reference to FIG. 7.

Figure 7:
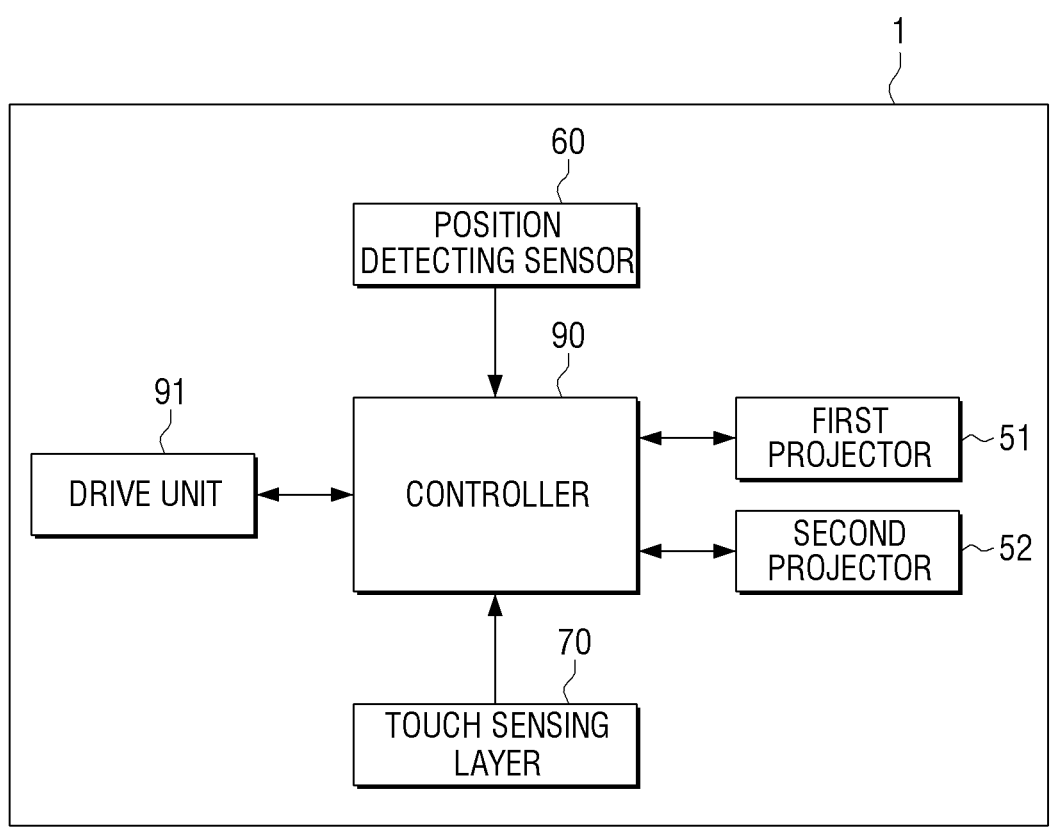
FIG. 7 is a functional block diagram of a reconfigurable mobile device according to an embodiment of the present disclosure.

FIG. 7 is a functional block diagram of a reconfigurable mobile device according to an embodiment of the present disclosure. For reference, FIG. 7 does not show components for implementing the general functions of the reconfigurable mobile device for convenience of description and illustration, but the controller may be formed to control the components that implement the general functions of the reconfigurable mobile device. The controller may be formed as an electronic circuit board which is disposed in at least one of the first body 10 and the second body 20.

Referring to FIG. 7, the controller 90 controls a drive unit 91 and projectors 51 and 52, and receives control signals from a position detecting sensor 60 and a touch sensing layer 70.

The drive unit 91 causes the multistage supporter 30 as described above to be extended or contracted, thereby controlling a degree of unfolding of the screen 40. The controller 90 controls the drive unit 91 according to a user's selection, thereby allowing the multistage supporter 30 to be extended or contracted. Accordingly, the controller 90 may control the drive unit 91 so that the screen 40 is fully unfolded as illustrated in FIG. 1A, the screen 40 is unfolded in half as illustrated in FIG. 1B, or the screen 40 is completely folded as illustrated in FIG. 1C. If the multistage supporter 30 is formed to be operated manually, the drive unit 91 is not provided or not used in the reconfigurable mobile device 1.

Also, the controller 90 controls the projectors 51 and 52 to project an image on the screen 40. Since the reconfigurable mobile device 1 as illustrated in FIG. 4 includes two projectors 51 and 52, the controller 90 controls the first and second projectors 51 and 52 to project the image onto the screen 40.

Specially, the controller 90 may be formed to adjust the size of the image to be projected on the screen 40 by the first and second projectors 51 and 52 according to the size of the screen 40 exposed between the first body 10 and the second body 20.

To this end, the reconfigurable mobile device 1 according to an embodiment of the present disclosure may include a position detecting sensor 60 that allows the controller 90 to recognize the size of the screen 40.

Since the size of the screen 40 is determined according to a state in which the plurality of supporting members 31, 32, 33, and 34 of the multistage supporter 30 is extended or contracted, the position detecting sensor 60 may be disposed in the multistage supporter 30. Alternatively, an encoder (not illustrated) may be disposed in the first and second screen winding portions 41 and 42 to detect the size of the exposed screen 40.

Hereinafter, the position detecting sensor 60 provided in the multistage supporter 30 of the reconfigurable mobile device 1 will be described with reference to FIGS. 8A to 8C.

Figure 8A:
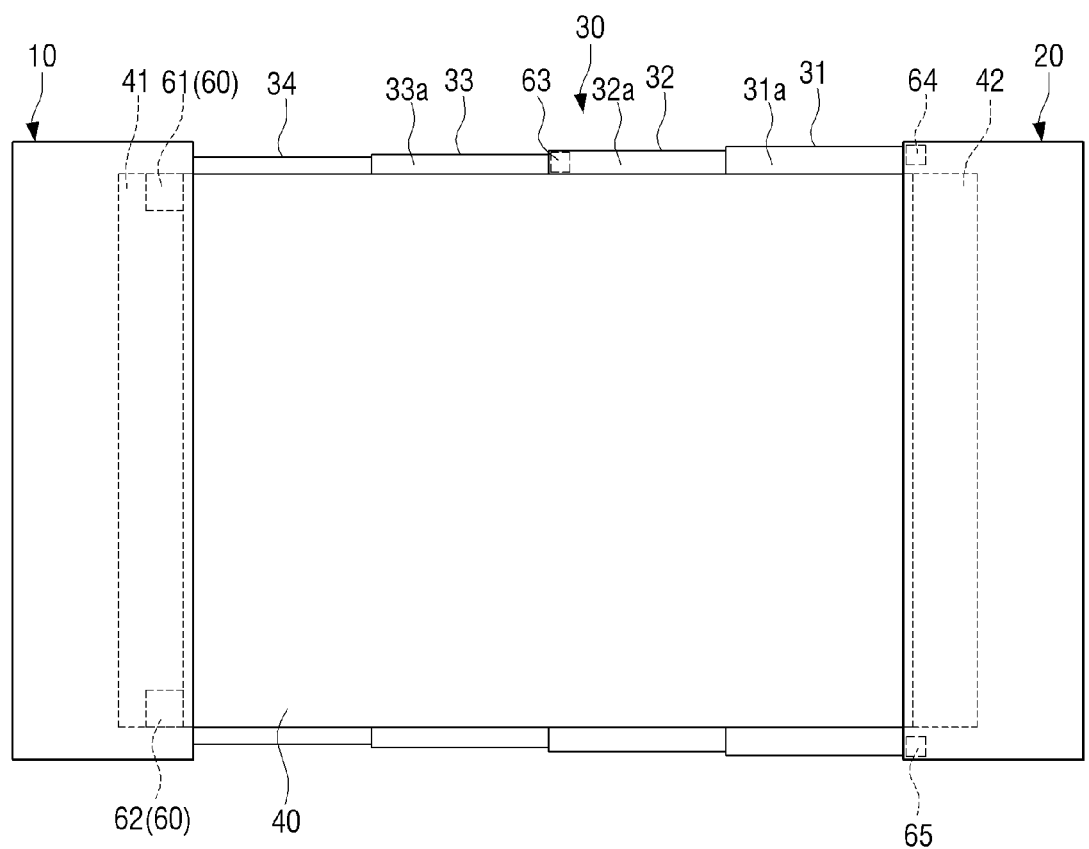
FIGS. 8A to 8C are views illustrating positions of a position detecting sensor in accordance with extension and contraction of a reconfigurable mobile device according to an embodiment of the present disclosure.
Figure 8B:
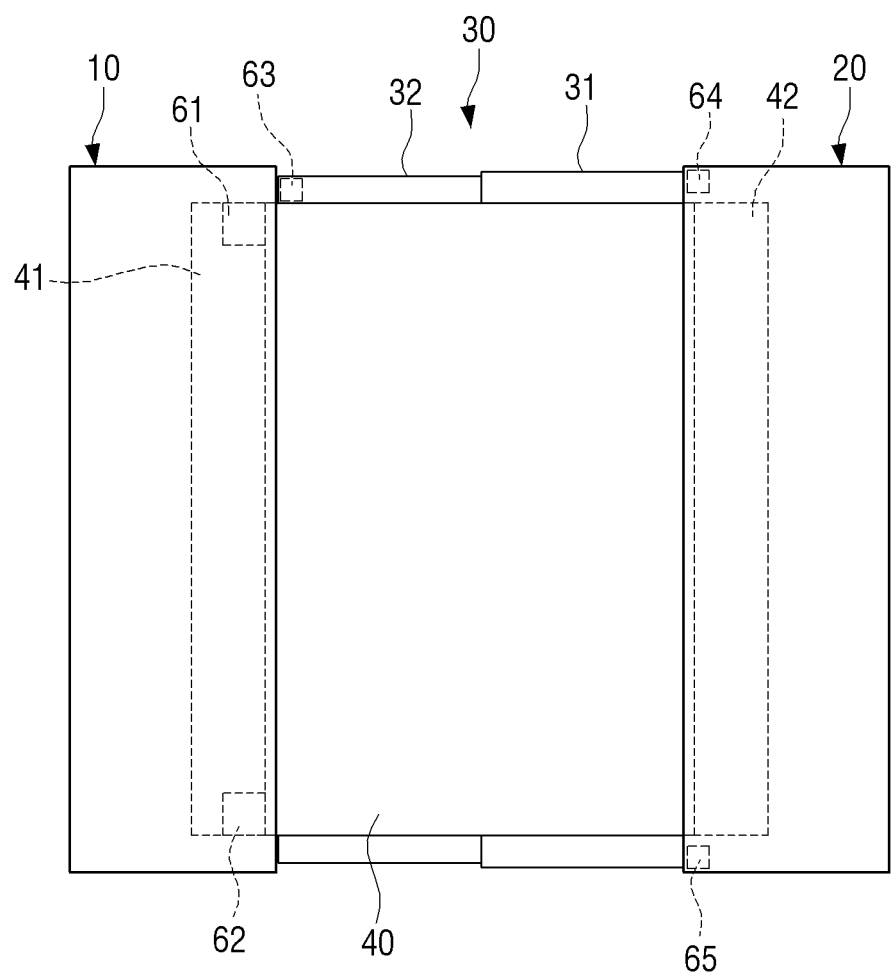
Figure 8C:
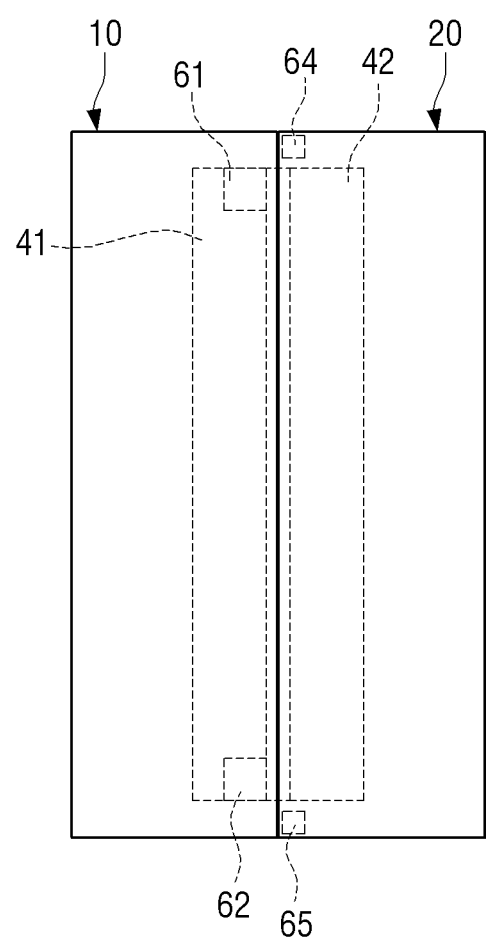

FIGS. 8A to 8C are views illustrating positions of a position detecting sensor in accordance with extension and contraction of a reconfigurable mobile device according to an embodiment of the present disclosure.

Referring to FIG. 8A, the position detecting sensor 60 may include two hall sensors 61 and 62. The two hall sensors, that is, a first hall sensor 61 and a second hall sensor 62 are provided in the first body 10. A first magnet 63 is provided in an end of a bezel 32*a* of the second supporting member 32 of the multistage supporter 30 that faces a bezel 33*a* of the third supporting member 33. Also, a second magnet 64 and a third magnet 65 are provided in the portions of the second body 20 adjacent to the bezel 31*a* of the first supporting member 31. The first and second hall sensors 61 and 62 are configured to output a signal when the magnets 64, 65, and 66 approach within a certain distance.

Accordingly, when the screen 40 is fully unfolded as illustrated in FIG. 8A, the first magnet 63 is located in the middle of the screen 40, and the second magnet 64 and the third magnet 65 are located in the second body 20 so that the first hall sensor 61 and the second hall sensor 62 provided in the first body 10 do not detect any one of the first magnet 63, the second magnet 64 and the third magnet 65. In this case, the controller 90 controls the first and second projectors 51 and 52 to project an image onto the left half and the right half of the screen 40, respectively.

When the screen 40 is only half unfolded as illustrated in FIG. 8B, the first magnet 63 is adjacent to the first hall sensor 61 so that the first hall sensor 61 outputs a magnet detecting signal. Accordingly, when the magnet detecting signal is output from the first hall sensor 61, the controller 90 determines that the screen 40 is half unfolded, and controls the first and second projectors 51 and 52 so that the first projector 51 projects an image onto the screen 40 and the second projector 52 does not project an image onto the screen 40. In other words, the controller 90 allows one of the two projectors 51 and 52 to project an image according to signals from the first hall sensor 61 and the second hall sensor 62.

When the first body 10 and the second body 20 are in contact with each other so that the screen 40 is not exposed as illustrated in FIG. 8C, the first hall sensor 61 is adjacent to the second magnet 64 and the second hall sensor 62 is adjacent to the third magnet 65 so that both the first hall sensor 61 and the second hall sensor 62 output the magnet detecting signal. When the magnet detecting signals are output from both the first hall sensor 61 and the second hall sensor 62, the controller 90 determines that the screen 40 is not exposed. Accordingly, the controller 90 controls the first and second projectors 51 and 52 so as not to project images.

As described above, the controller 90 may determine the unfolded state of the screen 40 using the hall sensors 61 and 62 provided in the first body 10 and the magnets 63, 64, and 65 provided in the multistage supporter 30 and the second body 20, and control the first and second projectors 51 and 52 depending on the unfolded state of the screen 40.

Further, the controller 90 may be formed to control the reconfigurable mobile device 1 by recognizing portions of the screen 40 to be touched. The screen 40 is provided with a touch sensing layer that allows the controller 90 to recognize touched portions of the screen 40.

The touch sensing layer may be formed to detect a position of the user's finger even when the user's finger is spaced apart from the screen 40 without direct contact with the surface of the screen 40. In other words, the touch sensing layer may be formed to detect the position and movement of the finger even when the finger is not in contact with the screen 40. The controller 90 detects the position and movement of the finger using the signal output from the touch sensing layer, and controls the reconfigurable mobile device 1 depending on the position and movement of the finger. In other words, the touch sensing layer of the present disclosure may be formed to enable a three-dimensional (3D) touch or a space touch that can control the reconfigurable mobile device 1 only by a finger close to the screen 40 without touching the screen 40. Also, the touch sensing layer of the present disclosure is formed to detect the position and movement of the finger even in the case of a two-dimensional touch in which the user's finger is directly in contact with the screen 40 in addition to the 3D touch.

In order to implement such a 3D touch, the touch sensing layer may use an infrared method, an electric field method, a capacitance oscillation method, etc. In the present embodiment, the screen 40 is provided with a touch sensing layer of the electric field method.

Hereinafter, a touch sensing layer 70 provided in the screen 40 will be described with reference to FIGS. 9 and 10.

Figure 9:
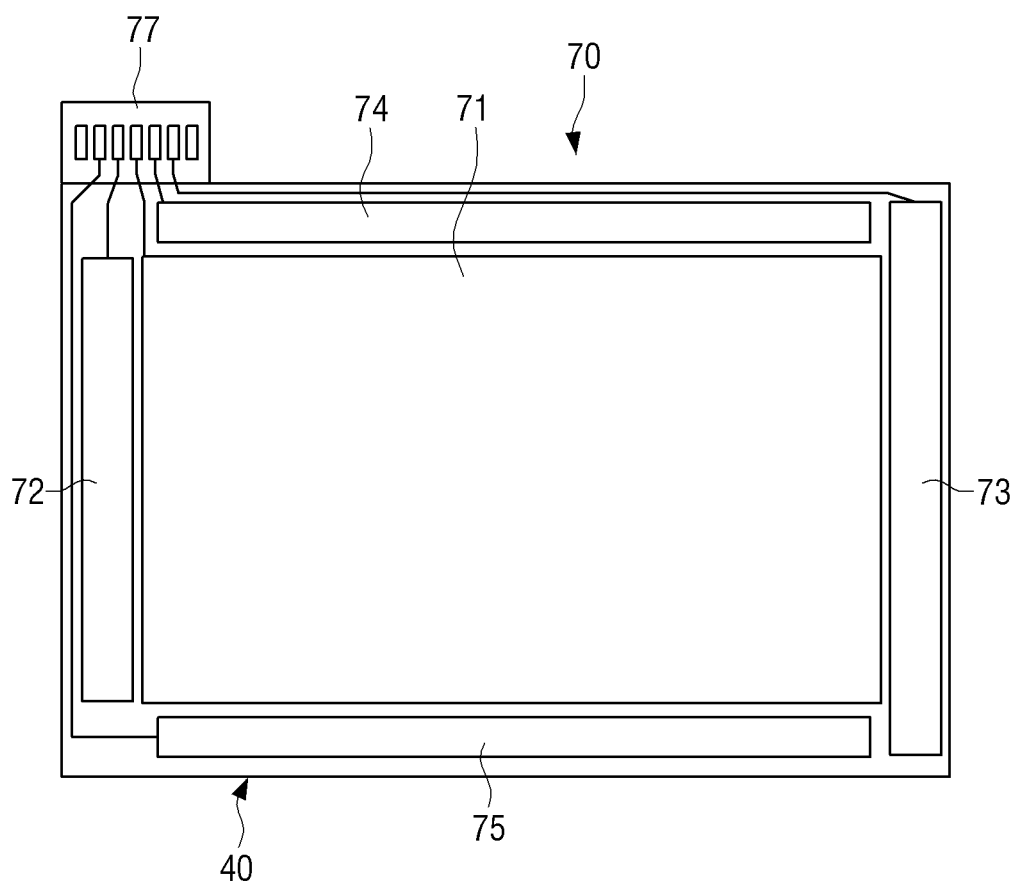
FIG. 9 is a plan view illustrating a touch sensing layer of a screen of a reconfigurable mobile device according to an embodiment of the present disclosure.
Figure 10:
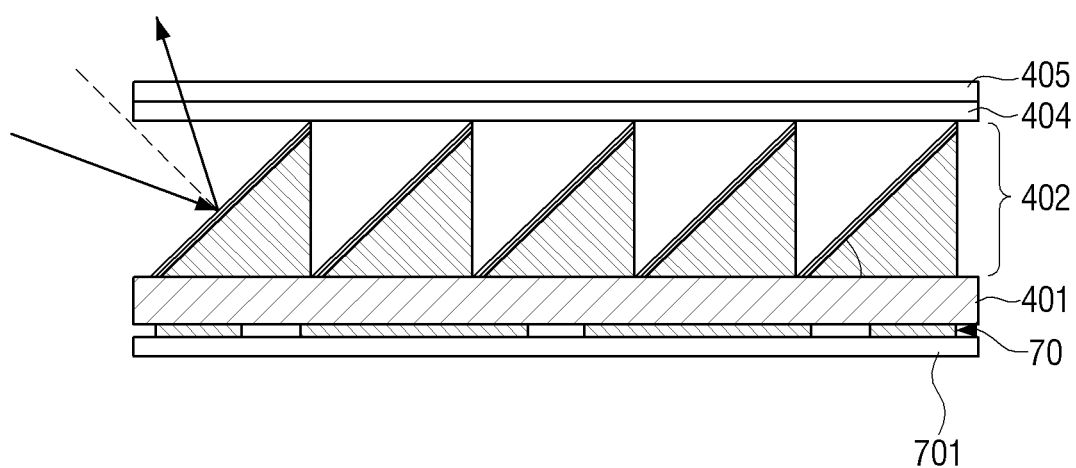
FIG. 10 is a partial cross-sectional view illustrating the screen of FIG. 5 to which the touch sensing layer of FIG. 9 is applied according to an embodiment of the present disclosure.

FIG. 9 is a plan view illustrating a touch sensing layer of a screen of a reconfigurable mobile device according to an embodiment of the present disclosure, and FIG. 10 is a partial cross-sectional view illustrating the screen of FIG. 5 to which the touch sensing layer of FIG. 9 is applied according to an embodiment of the present disclosure.

Referring to FIG. 10, the touch sensing layer 70 according to an embodiment of the present disclosure is provided below the support layer 401 of the screen 40. A protective layer 701 is provided below the touch sensing layer 70.

Referring to FIG. 9, the touch sensing layer 70 includes a transmission (Tx) electrode 71 and reception (Rx) electrodes 72, 73, 74, and 75 that are disposed on the same surface. The Tx electrode 71 is provided to correspond to a region of the screen 40 that is not covered by the bezel of the multistage supporter 30. Since the region of the screen 40 that is not covered by the bezel of the multistage supporter 30 is a substantially rectangular shape, the Tx electrode 71 is also formed in a substantially rectangular shape. Four Rx electrodes, that is, a left Rx electrode 72, a right Rx electrode 73, a front Rx electrode 74, and a rear Rx electrode 75 are provided in four sides of the Tx electrode 71. The single Tx electrode 71 and the four Rx electrodes 72, 73, 74, and 75 are electrically connected to the controller 90 through a terminal portion 77 provided in one side of the screen 40. The controller 90 may detect the position and movement of the finger by analyzing signals output from the touch sensing layer 70 through the terminal portion 77.

The Tx electrode 71 and the Rx electrodes 72, 73, 74, and 75 may be formed of a conductive material such as indium tin oxide (ITO), silver nano wire, etc.

In FIG. 10, the touch sensing layer 70 is illustrated and described to be provided below the support layer 401. However, the installation position of the touch sensing layer 70 is not limited thereto. Although not illustrated, if the screen 40 does not include the support layer 401, the touch sensing layer 70 may be directly disposed on the bottom surface of the reflective layer 402. In the case in which there is no support layer 401, the thickness of the screen 40 may be reduced.

Further, in FIG. 10, all of the Tx electrode 71 and the Rx electrodes 72, 73, 74, and 75 of the touch sensing layer 70 are provided on the same side of the screen 40, that is, the support layer 401. However, the installation position of the Tx electrode 71 and the Rx electrodes 72, 73, 74, and 75 is not limited thereto. As another example, the Tx electrode 71 and the Rx electrodes 72, 73, 74, and 75 may be provided in different layers of the screen 40.

In the reconfigurable mobile device 1 according to an embodiment of the present disclosure, since the size of the screen 40 is varied, when the screen 40 is not fully unfolded, the left Rx electrode 72 and the right Rx electrode 73 are wound, respectively, in the first screen winding portion 41 and the second screen winding portion 42 so as not to be exposed to the outside. In this case, the sensing sensitivity of the touch sensing layer 70 may be lowered.

In order to maintain the sensing sensitivity of the touch sensing layer 70 even when the size of the screen 40 is contracted, an Rx electrode may be disposed in the middle of the screen 40.

Figure 11:
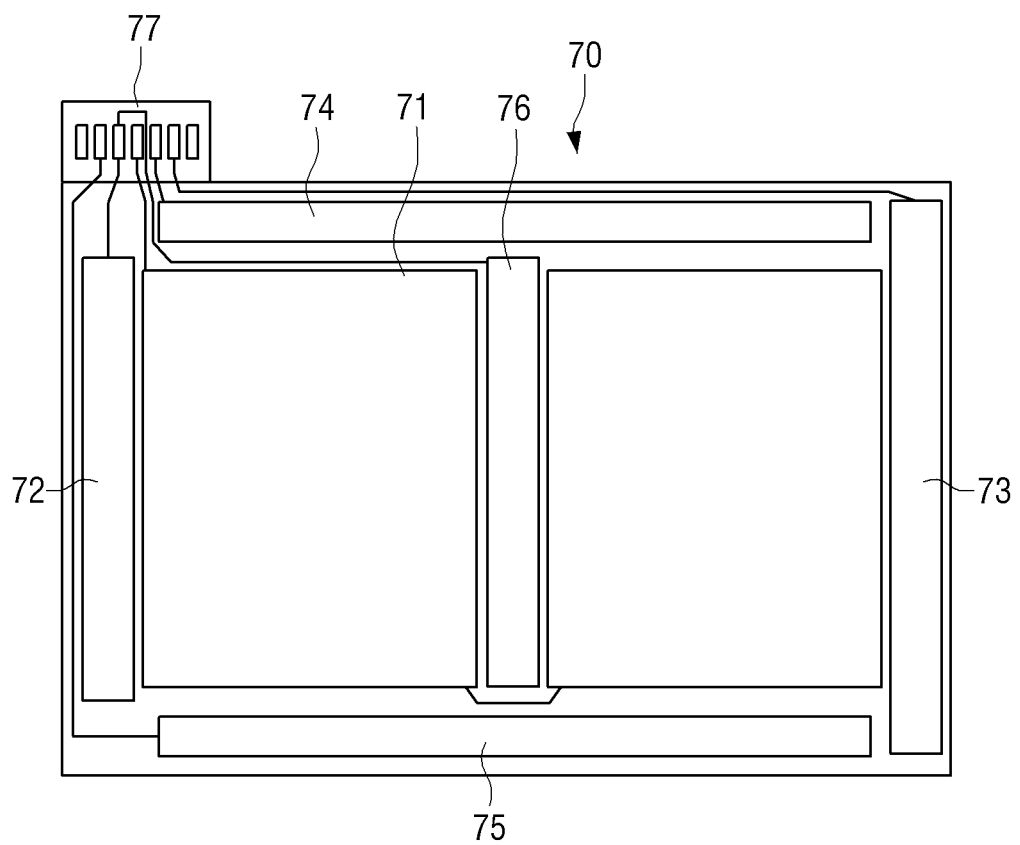
FIG. 11 is a plan view illustrating another touch sensing layer of a screen of a reconfigurable mobile device according to an embodiment of the present disclosure.

FIG. 11 is a plan view illustrating another touch sensing layer of a screen of a reconfigurable mobile device according to an embodiment of the present disclosure.

Referring to FIG. 11, if an Rx electrode 76 is disposed in the middle of the screen 40, even when the screen 40 is only half unfolded as illustrated in FIG. 1B, the middle Rx electrode 76 is positioned adjacent to the exposed area of the screen 40 so that the touch sensing layer 70 may accurately recognize the position and movement of the user's finger.

Figure 12:
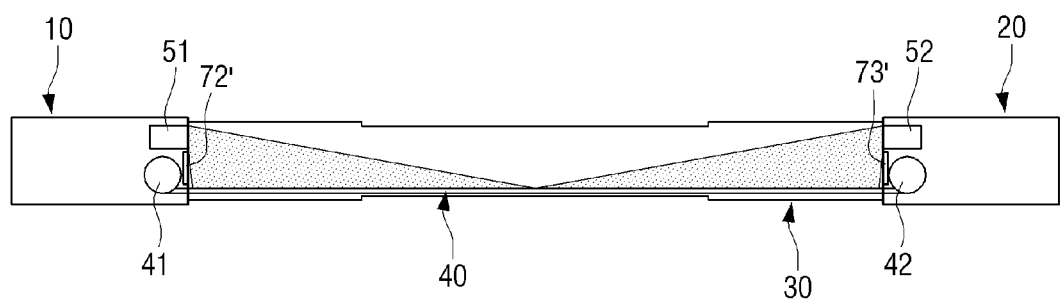
FIG. 12 is a cross-sectional view schematically illustrating the reconfigurable mobile device of FIG. 4 in which a reception electrode of a touch sensing layer of a screen is provided in a body according to an embodiment of the present disclosure.

FIG. 12 is a cross-sectional view schematically illustrating the reconfigurable mobile device of FIG. 4 in which a reception electrode of a touch sensing layer of a screen is provided in a body according to an embodiment of the present disclosure.

Referring to FIG. 12, a left Rx electrode 72' and a right Rx electrode 73' may be disposed in the first body 10 and the second body 20, respectively. Since the first body 10 and the second body 20 are located adjacent to the Tx electrode 71 of the screen 40 regardless of the extension and contraction of the screen 40, the position and movement of the finger that is located above the exposed screen 40 may be accurately recognized.

In FIG. 12, since the screen 40 is configured to be wound in the first screen winding portion 41 and the second screen winding portion 42, the left Rx electrode 72' is provided in the first body 10, and the right Rx electrode 73' is provided in the second body 20.

However, in the case in which the reconfigurable mobile device 1' is configured so that the screen 40 is wound in only one side as illustrated in FIG. 6, the Rx electrode may be provided in only one of the first and second bodies 10 and 20.

Figure 13:
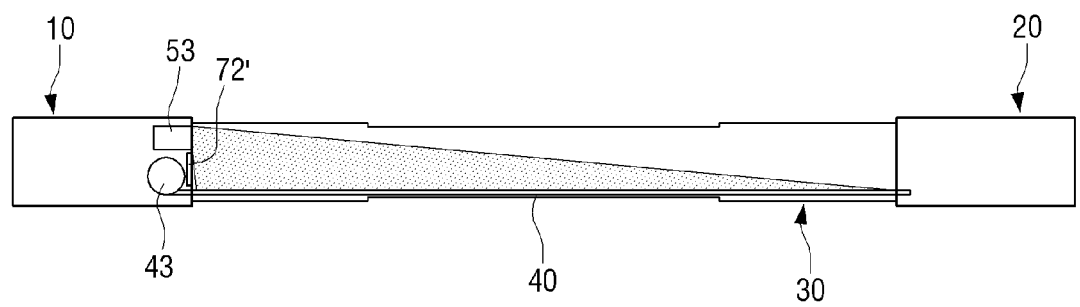
FIG. 13 is a cross-sectional view schematically illustrating the reconfigurable mobile device of FIG. 6 in which a reception electrode of a touch sensing layer of a screen is provided in a body according to an embodiment of the present disclosure.

FIG. 13 is a cross-sectional view schematically illustrating the reconfigurable mobile device of FIG. 6 in which a reception electrode of a touch sensing layer of a screen is provided in a body according to an embodiment of the present disclosure.

Referring to FIG. 13, the screen 40 is configured to be wound in the screen winding portion 43 provided in the first body 10. In this case, the right end of the screen 40 is maintained in a fixed position. Accordingly, even if the right Rx electrode 73 is provided in the right end of the screen 40 as illustrated in FIG. 9, when the screen 40 is contracted, the position of the right Rx electrode 73 with respect to the Tx electrode 71 of the screen 40 does not change. However, when contracting the screen 40, the left end of the screen 40 is wound to enter the screen winding portion 43 so that the position of the left end of the screen 40 with respect to the exposed screen 40 changes. Accordingly, the left Rx electrode 72' is provided in the first body 10 the position of which does not change with respect to the Tx electrode 71 of the exposed screen 40.

Different components constituting the reconfigurable mobile device 1 according to an embodiment of the present disclosure, for example, a battery, a front camera, a rear camera, a speaker, a microphone, an antenna, a motor, and the like may be disposed in, on or around the first body 10 and/or the second body 20. These components may be properly disposed not to interfere with the first and second projectors 51 and 52 and the first and second screen winding portions 41 and 42 as described above, and not to disturb the extending and contracting operation of the multistage supporter 30.

Hereinafter, a structure of the first projector 51 and the second projector 52 will be described in more detail with reference to FIGS. 14A to 14D. However, since the first projector 51 and the second projector 52 are formed in the same structure, in the following description, the first and second projectors 51 and 52 are not specified but collectively referred to as a projector.

FIGS. 14A to 14D are views schematically illustrating a variety of structures of a projector which is used in a reconfigurable mobile device according to an embodiment of the present disclosure. For reference, FIGS. 14A to 14D show only the projector 51 and the screen 40 for convenience of illustration and description.

Figure 14A:
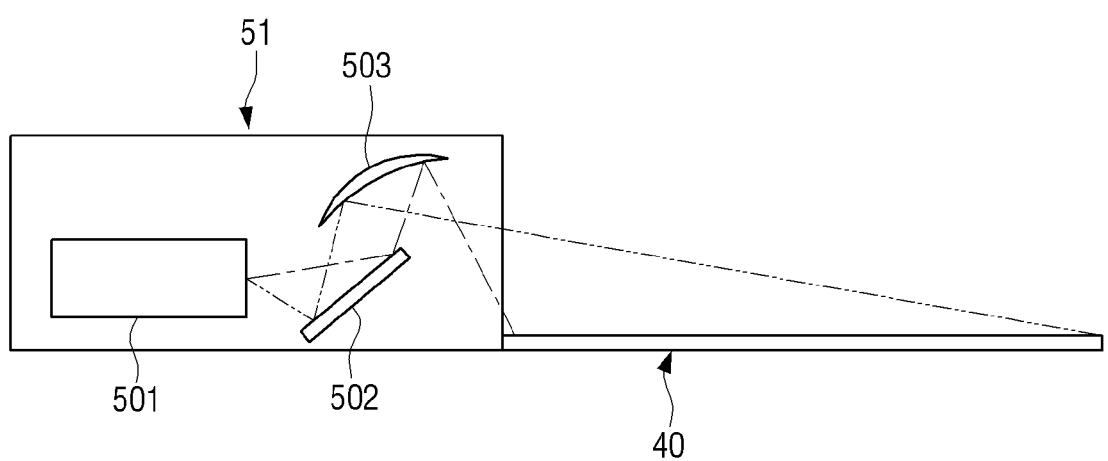
FIGS. 14A to 14D are views schematically illustrating a variety of structures of a projector which is used in a reconfigurable mobile device according to an embodiment of the present disclosure.

Referring to FIG. 14A, the projector 51 may include a projecting portion 501 and a reflective member. The projector 51 is formed to project an image onto the entire area of the screen 40.

The projecting portion 501 may include an image forming portion (not illustrated) to form an image depending on the control of the controller 90 and a light source (not illustrated) to project the image to the outside. The structure of the projecting portion 501 is similar to a projecting module of a pico projector of the related art and therefore, a detailed description thereof is omitted.

The reflective member changes the path of the light forming an image coming from the projecting portion 501 to allow the image to be formed on the entire area of the screen 40. The reflective member may include at least one aspherical mirror. The aspherical mirror may be formed to prevent the distortion of the image and to enlarge the image coming from the projecting portion 501 to match the size of the screen 40.

The reflective member of the projector 51 as illustrated in FIG. 14A includes a single flat mirror 502 and a single aspherical mirror 503. The flat mirror 502 is disposed adjacent to the projecting portion 501, and the aspherical mirror 503 is located in downstream of the flat mirror 502 in the traveling direction of the light, and is disposed above (i.e., opposite) the flat mirror 502. Accordingly, the flat mirror 502 reflects the light emitted from the projecting portion 501 to the aspherical mirror 503. The aspherical mirror 503 reflects the light incident from the flat mirror 502 to the screen 40. At this time, the aspherical mirror 503 enlarges the light incident from the flat mirror 502 to correspond to the entire area of the screen 40.

Figure 14B:
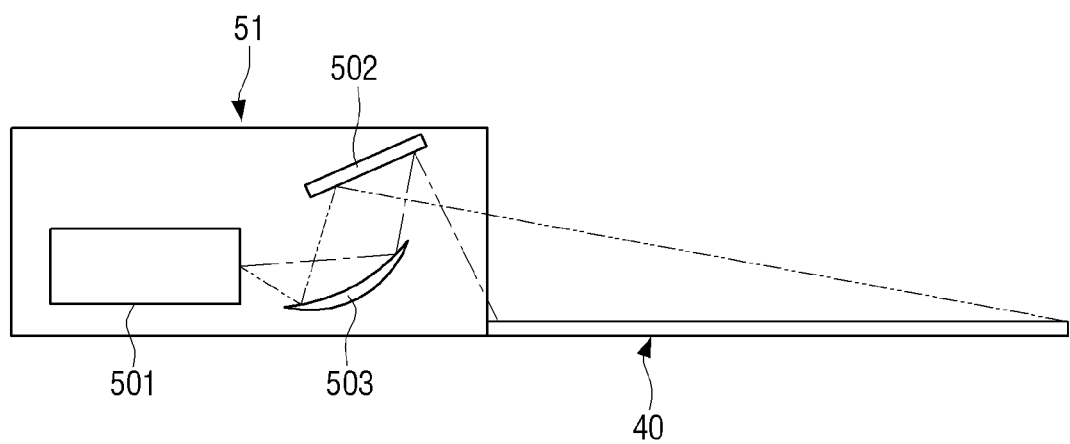

The reflective member of the projector 51 as illustrated in FIG. 14B includes a single flat mirror 502 and a single aspherical mirror 503. The aspherical mirror 503 is disposed adjacent to the projecting portion 501, and the flat mirror 502 is located in downstream of the aspherical mirror 503 in the traveling direction of the light, and is disposed above the aspherical mirror 503. Accordingly, the aspherical mirror 503 enlarges and reflects the light emitted from the projecting portion 501 to the flat mirror 502. The flat mirror 502 reflects the light to the screen 40 by changing the path of the light incident from the flat mirror 502. At this time, since the light reflected from the flat mirror 502 is the light having passed through the aspherical mirror 503, the light is enlarged to correspond to the size of the screen 40.

Figure 14C:
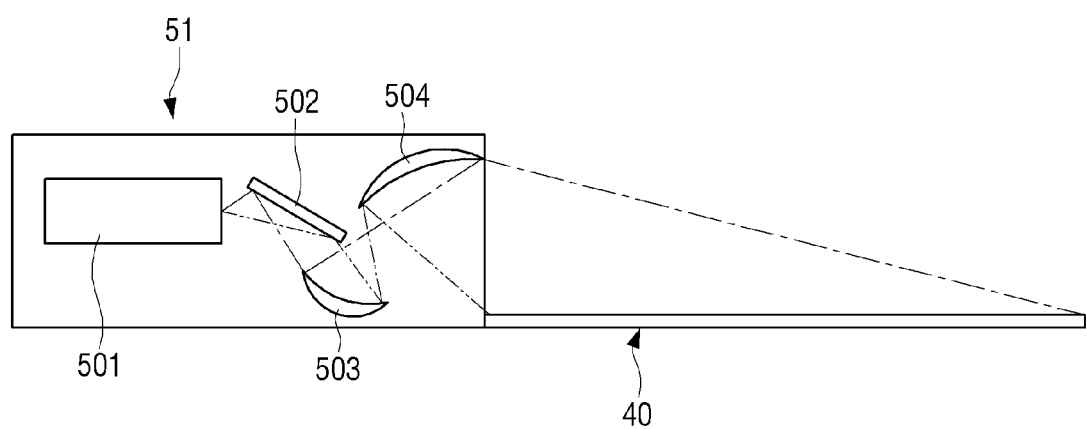

The reflective member of the projector 51 as illustrated in FIG. 14C includes a single flat mirror 502 and two aspherical mirrors 503 and 504. The flat mirror 502 is disposed adjacent to the projecting portion 501, and the two aspherical mirrors 503 and 504 are located in downstream of the flat mirror 502 in the traveling direction of the light. As the light emitted from the projecting portion 501 passes through the two aspherical mirrors 503 and 504, the light is enlarged to form an image corresponding to a screen larger than the projector 51 having the single aspherical mirror 503 as illustrated in FIGS. 14A and 14B.

In FIG. 14C, the flat mirror 502 and the two aspherical mirrors 503 and 504 are disposed in the order of the flat mirror 502, the first aspherical mirror 503, and the second aspherical mirror 504 in the light traveling direction. However, the arrangement of those is not limited thereto. If the aspheric surface of each of the first and second aspherical mirrors 503 and 504 is appropriately designed, the order of the arrangement of the flat mirror 502, the first aspherical mirror 503, and the second aspherical mirror 504 may be changed arbitrarily.

Figure 14D:
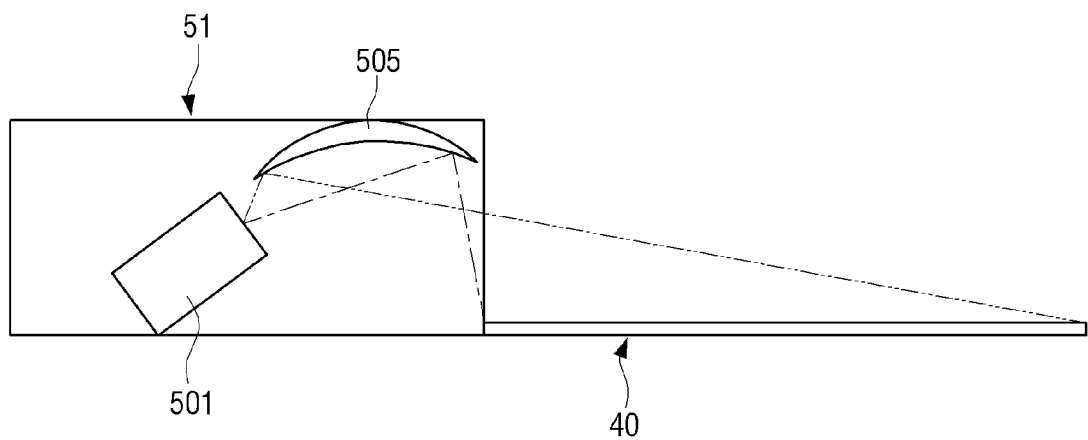

In addition, the reflective member of the projector 51 as illustrated in FIG. 14D includes only a single aspherical mirror 505. If the position of the projecting portion 501 and the aspheric surface design of the aspherical mirror 505 are properly adjusted, the image emitted from the projecting portion 501 may be projected onto the entire area of the screen 40 by only the single aspherical mirror 505.

The reflective member of the projector 51 as described above includes two or more mirrors including at least one aspherical mirror, and the two or more mirrors are spaced apart a predetermined distance. Accordingly, the thickness of the reconfigurable mobile device 1 according to an embodiment of the present disclosure may be determined by the height of the projector 51.

When the reconfigurable mobile device 1 is not used, it is not necessary to maintain a predetermined interval of the two or more mirrors constituting the reflective member. Accordingly, in order to minimize the thickness of the reconfigurable mobile device 1 when carrying the reflective member may be formed to be foldable.

Hereinafter, a reconfigurable mobile device provided with a foldable reflective member will be described with reference to FIGS. 15A and 15B.

Figure 15A:
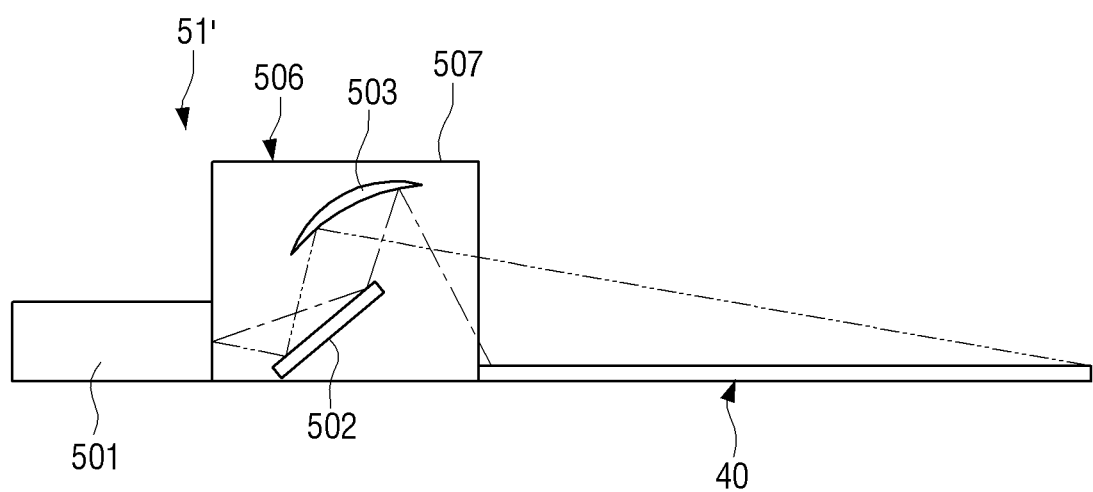
FIGS. 15A and 15B are views illustrating an operation of a foldable reflecting member which is used in a reconfigurable mobile device according to an embodiment of the present disclosure.
Figure 15B:
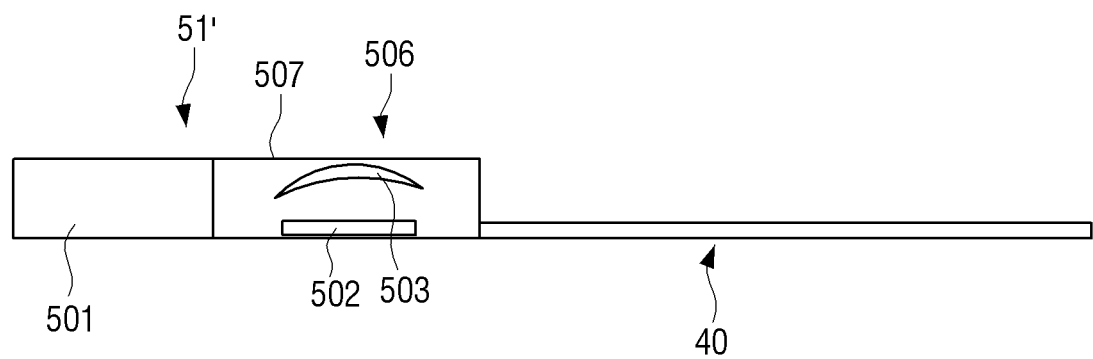

FIG. 15A is a view illustrating the foldable reflective member when a reconfigurable mobile device is used according to an embodiment of the present disclosure, and FIG. 15B is a view illustrating the foldable reflective member when a reconfigurable mobile device is not used according to an embodiment of the present disclosure.

Referring to FIG. 15A, the projector 51' of the reconfigurable mobile device 1 according to an embodiment of the present disclosure includes a projecting portion 501 and a foldable reflective member 506. The screen 40 is provided in one side of the foldable reflective member 506 of the projector 51'.

When the reconfigurable mobile device 1 is used, as illustrated in FIG. 15A, the light coming from the projecting portion 501 is reflected by the flat mirror 502 and the aspherical mirror 503 to be projected onto the screen 40. At this time, each of the flat mirror 502 and the aspherical mirror 503 has a certain angle with respect to the projecting portion 501 and a predetermined gap is maintained between the flat mirror 502 and the aspherical mirror 503 so that the image coming from the projecting portion 501 is enlarged and projected to match the size of the screen 40 by the flat mirror 502 and the aspherical mirror 503.

When the reconfigurable mobile device 1 is not used, the projecting portion 501 does not output the image. Then, the user is able to press a top surface of a case 507 of the foldable reflective member 506. So, while the case 507 is folded, the flat mirror 502 and the aspherical mirror 503 that are disposed inside the case 507 are moved adjacent to each other. At this time, as illustrated in FIG. 15B, the height of the case 507 of the foldable reflective member 506 is the same as the height of the projecting portion 501.

When it is desired to use the reconfigurable mobile device 1, the user again presses the top surface of the case 507 of the foldable reflective member 506 so that the case 507 is extended and the flat mirror 502 and the aspherical mirror 503 disposed inside the case 507 are moved to have a predetermined angle and a predetermined gap. Accordingly, when the projecting portion 501 projects an image, the image travels along the optical path formed by the flat mirror 502 and the aspherical mirror 503 so as to be projected onto the entire area of the screen 40.

In the above description, the foldable reflective member 506 is configured to be operated manually by the pressing action of the user. However, the structure of the foldable reflective member 506 is not limited thereto. As another example, the case 507 of the foldable reflective member 506 may be configured to be automatically operated, and the foldable reflective member 506 may be configured to be automatically extended or contracted according to the operation of the reconfigurable mobile device 1.

In the above description, the screen 40 is configured to be placed on the lower side of the multistage supporter 30, that is, on the top surface of the lower portion of the multistage supporter 30. However, the present disclosure is not limited thereto. The screen 40 may be disposed to be placed in the upper side of the multistage supporter 30.

Hereinafter, a reconfigurable mobile device provided with the screen 40 that is located in the upper side of the multistage supporter 30 will be described with reference to FIGS. 16 and 17.

Figure 16:
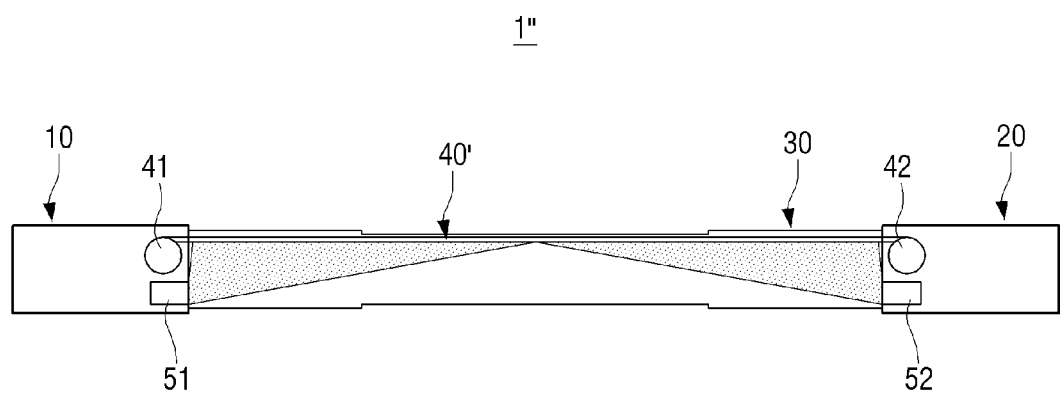
FIG. 16 is a cross-sectional view schematically illustrating another example of a reconfigurable mobile device according to an embodiment of the present disclosure.
Figure 17:
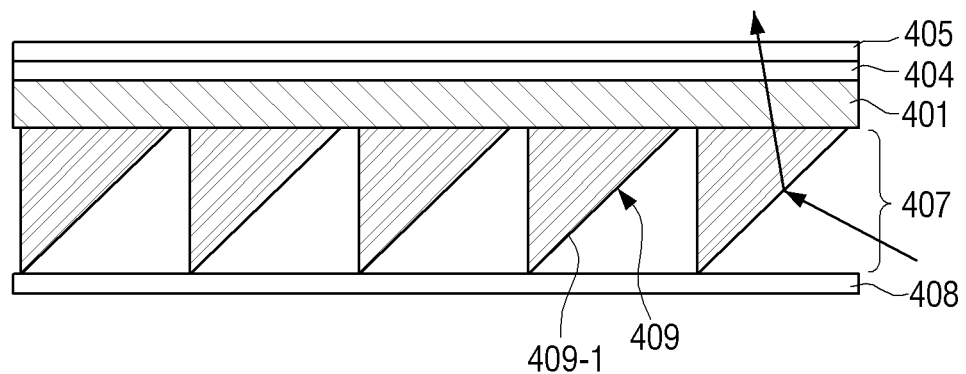
FIG. 17 is a partial cross-sectional view illustrating a structure of a screen which is used in the reconfigurable mobile device of FIG. 16 according to an embodiment of the present disclosure.

FIG. 16 is a cross-sectional view schematically illustrating another example of a reconfigurable mobile device according to an embodiment of the present disclosure, and FIG. 17 is a partial cross-sectional view illustrating a structure of a screen used in the reconfigurable mobile device of FIG. 16 according to an embodiment of the present disclosure.

Referring to FIG. 16, a reconfigurable mobile device 1" according to an embodiment of the present disclosure may include a first body 10, a second body 20, a multistage supporter 30, a screen 40', first and second screen winding portions 41 and 42, and first and second projectors 51 and 52.

The structure of each of the first body 10, the second body 20, and the multistage supporter 30 is the same as or similar to those of the reconfigurable mobile device 1 according to an embodiment as described above; therefore, detailed description thereof is omitted.

The screen 40' is provided in the upper side of the multistage supporter 30. In more detail, when the multistage supporter 30 of the reconfigurable mobile device 1" is fully extended as illustrated in FIG. 16, the screen 40' is disposed to block the open top surface of the multistage supporter 30. Accordingly, in the present embodiment, there is no space between the screen 40' and the top end of the multistage supporter 30.

The first screen winding portion 41 is provided in the first body 10 to wind the left portion of the screen 40'. Also, the second screen winding portion 42 is provided in the second body 20 to wind the right portion of the screen 40'. The structure of the first and second screen winding portions 41 and 42 that automatically wind or unwind the screen 40' in accordance with the movement of the multistage supporter 30 is the same as those of the reconfigurable mobile device 1 according to an embodiment as described above.

The first projector 51 is provided inside the first body 10 to project an image onto the left half of the screen 40'. At this time, the first projector 51 is disposed to project an image toward the screen 40' below the screen 40'. In other words, the first projector 51 is disposed below the first screen winding portion 41.

The second projector 52 is provided inside the second body 20 to project onto the right half of the screen 40'. At this time, the second projector 52 is disposed to project an image toward the screen 40' below the screen 40'. In other words, the second projector 52 is disposed below the second screen winding portion 42.

The structure of the first and second projectors 51 and 52 is the same as that of the reconfigurable mobile device 1 according to an embodiment as described above. Therefore, a detailed description thereof is omitted.

The screen 40' is formed to refract the image emitted from the first and second projectors 51 and 52 provided below the screen 40', and emit the refracted image toward the front side of the reconfigurable mobile device 1.

Referring to FIG. 17, the screen 40' may include a support layer 401, a prism layer 407, a prism protective layer 408, a tint layer 404, and an anti-reflective layer 405.

The support layer 401 is formed to support the prism layer 407. The support layer 401 may be formed of a PET film As another example, the support layer 401 may be formed as a silicon envelope that is formed by two overlapped silicon films and is provided with electro-rheological (ER) fluid received between the two silicon films. If the support layer 401 is formed by the ER fluid, when a predetermined voltage is applied to the support layer 401, the silicon envelope is hardened by the ER fluid so that the stiffness of the support layer 401 may be selectively controlled.

The prism layer 407 is provided on the bottom surface of the support layer 401, and is formed to transmit the image, which is projected from the first projector 51 and the second projector 52 disposed below the screen 40', toward the support layer 401, that is, the front side of the reconfigurable mobile device 1. In more detail, the prism layer 407 includes a plurality of prisms 409 that is arranged parallel to each other. Each of the plurality of prisms 409 is substantially formed in a triangular pole shape having a cross section of a right-angled triangle, and is disposed so that an inclined surface 409-1 of each of the prisms 409 faces the first projector 51 or the second projector 52. For example, the inclined surfaces 409-1 of the plurality of prisms 409 of the prism layer 407 corresponding to the left half of the screen 40' are formed to face the first projector 51, and the inclined surfaces 409-1 of the plurality of prisms 409 of the prism layer 407 corresponding to the right half of the screen 40' are formed to face the second projector 52. Also, each of the plurality of prisms 409 of the prism layer 407 may be formed to refract the light incident on the inclined surface 409-1 toward the support layer 401.

The prism protective layer 408 may be provided on the bottom surface of the prism layer 407.

The tint layer 404 is provided on the top surface of the support layer 401, and is formed to diffuse the transmitting light refracted in the prism layer 407. The tint layer 404 may be formed by coating a material that can diffuse the refracted light on the top surface of the support layer 401.

The anti-reflective layer 405 is formed to block external light from being reflected by the screen 40'. Accordingly, the anti-reflective layer 405 may prevent the image, which is projected by the first and second projectors 51 and 52 and is refracted by the prism layer 407, from not being seen by the external light reflected from the screen 40'.

The prism protective layer 408, the prism layer 407, the support layer 401, the tint layer 404, and the anti-reflective layer 405 as described above may be laminated in sequence, thereby forming the screen 40' that transmits the light projected from the projectors 51 and 52 disposed below the screen 40'

In FIG. 17, the screen 40' is formed in a structure having the support layer 401 on the prism layer 407. However, the support layer 401 may be removed to reduce the thickness of the screen 40'. In this case, the tint layer 404 may be formed directly on the top surface of the prism layer 407.

The screen 40' as illustrated in FIG. 17 may be provided with a touch sensing layer to control the reconfigurable mobile device 1' by touching the screen 40' like the screen 40 of the reconfigurable mobile device 1 according to an embodiment as described above.

Figure 18:
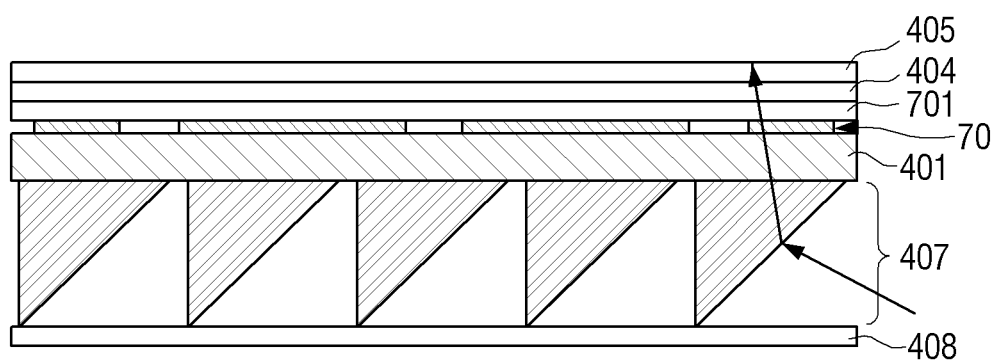
FIG. 18 is a partial cross-sectional view illustrating the screen of FIG. 17 to which the touch sensing layer of FIG. 9 is applied according to an embodiment of the present disclosure.

FIG. 18 is a partial cross-sectional view illustrating the screen of FIG. 17 to which the touch sensing layer of FIG. 9 is applied according to an embodiment of the present disclosure.

Referring to FIG. 18, the touch sensing layer 70 is provided on a top surface of the support layer 401. A protective layer 701 may be provided on a top surface of the touch sensing layer 70. The tint layer 404 and the anti-reflective layer 405 are sequentially formed on the protective layer 701.

The touch sensing layer 70 may be formed to enable the 3D touch or the space touch that can control the reconfigurable mobile device 1 without touching the screen 40'. Also, the touch sensing layer 70 may be formed to detect the position and movement of the finger even in the case of two-dimensional touch in which the user's finger is directly in contact with the screen 40' in addition to the 3D touch. In the present embodiment, since the screen 40' is located above the projectors 51 and 52, even when the user performs the two-dimensional touch, the image being projected onto the screen 40 is not covered by the user's hand The touch sensing layer 70 as illustrated in FIG. 18 is an electric field type touch sensing layer having the same structure as the touch sensing layer 70 of the screen 40 of the reconfigurable mobile device 1 according to an embodiment as described above.

Accordingly, the touch sensing layer 70 is provided with the Tx electrode and the Rx electrodes that are arranged on the same side. The Tx electrode is formed in a substantially rectangular shape to correspond to a region of the screen that is not covered by the bezel of the multistage supporter. Four Rx electrodes, that is, a front Rx electrode, a rear Rx electrode, a left Rx electrode, and a right Rx electrode are provided in four sides of the Tx electrode. The single Tx electrode and the four Rx electrodes are electrically connected to the controller through a terminal portion provided in one side of the screen. The controller may detect the position and movement of the finger by analyzing signals output from the touch sensing layer through the terminal portion.

The Tx electrode and the Rx electrodes constituting the touch sensing layer 70 may be formed of a conductive material such as ITO, silver nano wire, etc.

In FIG. 18, the touch sensing layer 70 is illustrated and described to be provided on the top surface of the support layer 401. However, the installation position of the touch sensing layer 70 is not limited thereto. Although not illustrated, if the screen 40' does not include the support layer 401, the touch sensing layer 70 may be directly disposed on the top surface of the prism layer 407. In the case in which there is no support layer 401, the thickness of the screen 40' may be reduced.

As illustrated in FIG. 16, the reconfigurable mobile device 1 in which the screen 40' is located in the upper side of the multistage supporter 30 and the projectors 51 and 52 are located below the screen 40' has an advantage that even when the user directly touches the screen 40', the image is not blocked by the user's hand Also, the reconfigurable mobile device 1", the screen 40' of which is positioned above the projectors 51 and 52 as illustrated in FIG. 16, may implement a 3D image. However, in order to display the 3D image, the structure of a screen is different from the screen 40' of the reconfigurable mobile device 1" as described above.

Hereinafter, the structure of a screen that can display a 3D image in the reconfigurable mobile device 1" of FIG. 16 will be described with reference to FIGS. 19A and 19B.

Figure 19A:
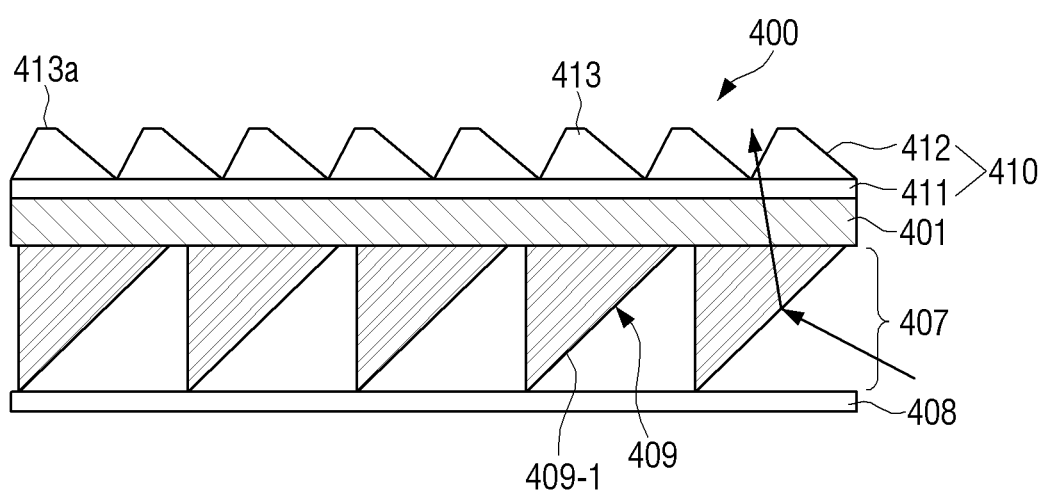
FIG. 19A is a partial cross-sectional view illustrating a structure of a screen capable of displaying a three-dimensional (3D) image of the reconfigurable mobile device of FIG. 16 according to an embodiment of the present disclosure.
Figure 19B:
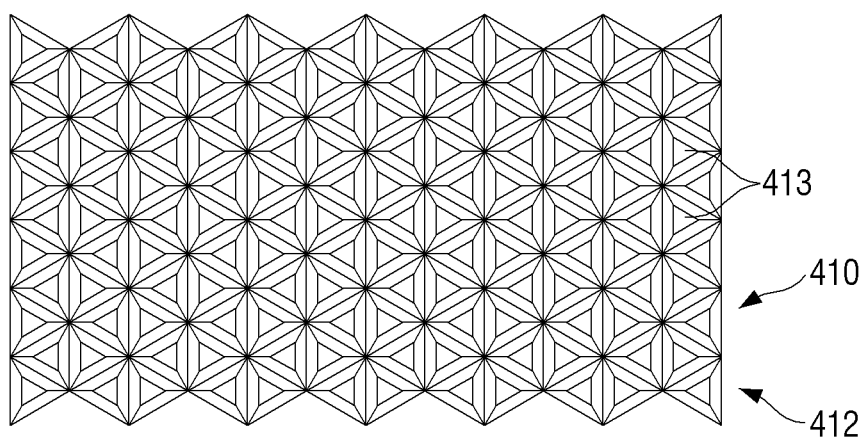
FIG. 19B is a partial plan view illustrating an aerial image (AI) plate layer of FIG. 19A according to an embodiment of the present disclosure.

FIG. 19A is a partial cross-sectional view illustrating a screen capable of displaying 3D images of the reconfigurable mobile device of FIG. 16 according to an embodiment of the present disclosure, and FIG. 19B is a partial plan view illustrating an aerial image (AI) plate layer of FIG. 19A according to an embodiment of the present disclosure.

Referring to FIG. 19A, the screen 400 may include a support layer 401, a prism layer 407, a prism protective layer 408, and an AI plate layer 410.

The support layer 401 is formed to support the prism layer 407. The support layer 401 may be formed of a PET film For example, the support layer 401 may be formed as a silicon envelope that is formed by two overlapped silicon films and is provided with ER fluid received between the two silicon films. If the support layer 401 is formed of the ER fluid, when a predetermined voltage is applied to the support layer 401, the silicon envelope is hardened by the ER fluid so that the stiffness of the support layer 401 may be selectively controlled.

The prism layer 407 is provided on the bottom surface of the support layer 401, and is formed to transmit the image, which is projected from the first projector 51 and the second projector 52 disposed below the screen 400, toward the support layer 401, that is, the front side of the reconfigurable mobile device 1". In more detail, the prism layer 407 includes a plurality of prisms 409 that are arranged parallel to each other. Each of the plurality of prisms 409 is formed in a substantially triangular pole shape having a cross section of a right-angled triangle, and is disposed so that an inclined surface 409-1 of each of the prisms 409 faces the first projector 51 or the second projector 52. For example, the inclined surfaces 409-1 of the plurality of prisms 409 of the prism layer 407 corresponding to the left half of the screen 400 are formed to face the first projector 51, and the inclined surfaces 409-1 of the plurality of prisms 409 of the prism layer 407 corresponding to the right half of the screen 400 are formed to face the second projector 52. Also, the plurality of prisms 409 of the prism layer 407 may be formed to refract the light incident on the inclined surface 409-1 toward the support layer 401.

The prism protective layer 408 may be provided on the bottom surface of the prism layer 407.

The AI plate layer 410 is provided on the top surface of the support layer 401, and allows the image, which is projected from the first and second projectors 51 and 52 and is incident through the prism layer 407, to be displayed at a position which is spaced apart a predetermined distance from the AI plate layer 410. At this time, the image being displayed above the AI plate layer 410 may be the 3D image.

The AI plate layer 410 may be configured of a half mirror layer 411 and a protrusion layer 412. The half mirror layer 411 is formed to reflect some of the incident light, that is, the image that is incident from the prism layer 407, and to transmit the rest of the incident light. For example, the half mirror layer 411 may be formed in a planar shape, and the light transmittance may be implemented with about 20 to 80%.

The protrusion layer 412 may be configured of a plurality of truncated regular tetrahedrons 413 having the same size and height. The plurality of truncated regular tetrahedrons 413 is arranged in a regular hexagonal shape as illustrated in FIG. 19B. The plurality of truncated regular tetrahedrons 413 may be formed of transparent plastic. Also, three side surfaces of each of the plurality of truncated regular tetrahedrons 413 are formed by the mirror surface processing. Accordingly, the light incident on the bottom surface of the truncated regular tetrahedron 413 is emitted to the outside through the top surface 413 a of the truncated regular tetrahedron 413.

The prism protective layer 408, the prism layer 407, the support layer 401, and the AI plate layer 410 as described above may be laminated in sequence, thereby forming the screen 400 that transmits the light projected from the projectors 51 and 52 disposed below the screen 400.

When first and second projectors 51 and 52 project the image onto the screen 400 provided with the AI plate layer 410, a 3D image floating in the air is formed above the screen 400 so that the user may see the 3D image without wearing stereoscopic glasses.

Figure 20:
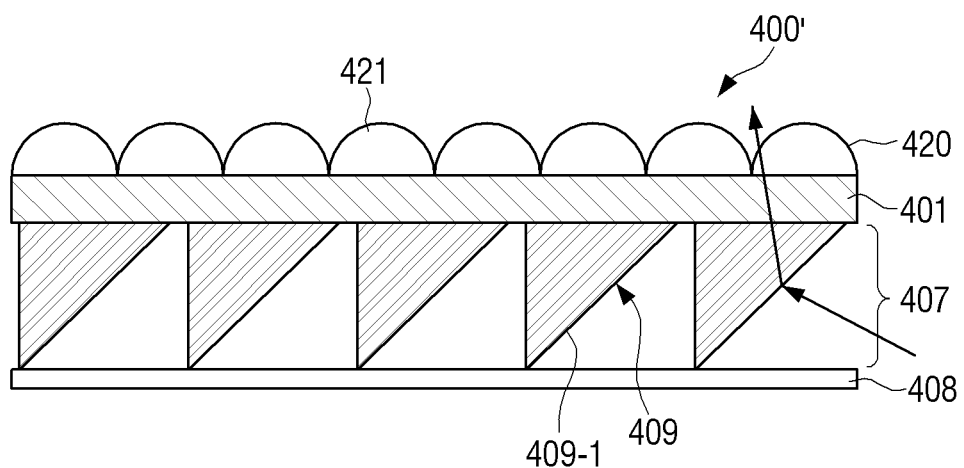
FIG. 20 is a partial cross-sectional view illustrating another screen capable of displaying a 3D image of the reconfigurable mobile device of FIG. 16 according to an embodiment of the present disclosure.

FIG. 20 is a partial cross-sectional view illustrating another screen capable of displaying 3D images of the reconfigurable mobile device of FIG. 16 according to an embodiment of the present disclosure.

Referring to FIG. 20, the screen 400' may include a support layer 401, a prism layer 407, a prism protective layer 408, and a lenticular layer 420.

The support layer 401 is formed to support the prism layer 407. The support layer 401 may be formed as the same as or similar to the support layer 401 of the screen 400 described in FIG. 19A; therefore, detailed description thereof is omitted.

The prism layer 407 is provided on the bottom surface of the support layer 401, and is formed to transmit the image, which is projected from the first projector 51 and the second projector 52 disposed below the screen 400', toward the support layer 401, that is, the front side of the reconfigurable mobile device 1". The prism layer 407 may be formed as the same as or similar to the prism layer 407 of the screen 400 described in FIG. 19A; therefore, detailed description thereof is omitted.

The prism protective layer 408 may be provided on the bottom surface of the prism layer 407.

The lenticular layer 420 is provided on the top surface of the support layer 401, and is formed in a form in which a plurality of lenses 421 of a semi-cylindrical shape is arranged in a row.

The prism protective layer 408, the prism layer 407, the support layer 401, and the lenticular layer 420 as described above may be laminated in sequence, thereby forming the screen 400' that transmits the light projected from the first and second projectors 51 and 52 disposed below the screen 400'.

If the controller 90 controls the first and second projectors 51 and 52 to alternatively project the left-eye image and the right-eye image onto the screen 400', the user can see the 3D image through the lenticular layer 420 of the screen 400'.

Figure 21:
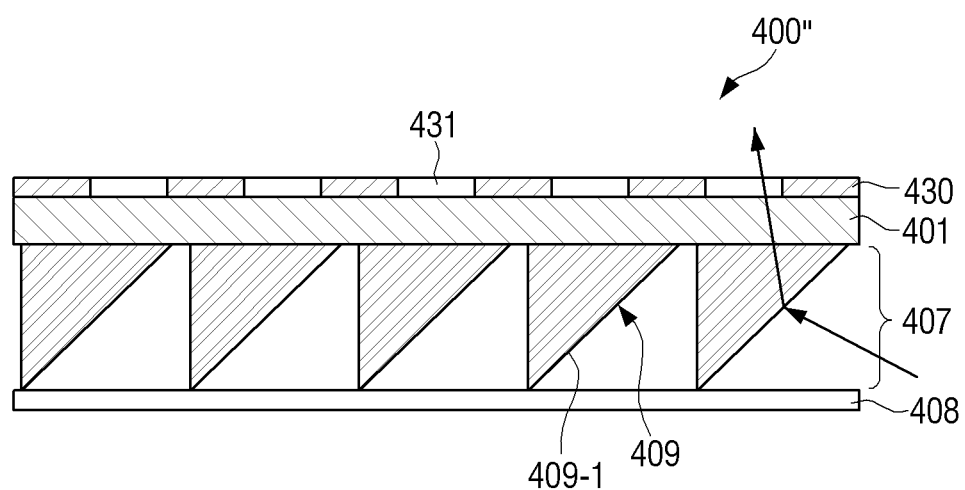
FIG. 21 is a partial cross-sectional view illustrating still another screen capable of displaying a 3D image of the reconfigurable mobile device of FIG. 16 according to an embodiment of the present disclosure.

FIG. 21 is a partial cross-sectional view illustrating still another screen capable of displaying 3D images of the reconfigurable mobile device of FIG. 16 according to an embodiment of the present disclosure.

Referring to FIG. 21, the screen 400" may include a support layer 401, a prism layer 407, a prism protective layer 408, and a parallax barrier layer 430.

The support layer 401 is formed to support the prism layer 407 and the parallax barrier layer 430. The support layer 401 may be formed as the same as or similar to the support layer 401 of the screen 400 described in FIG. 19A; therefore, detailed description thereof is omitted.

The prism layer 407 is provided on the bottom surface of the support layer 401, and is formed to transmit the image, which is projected from the first projector 51 and the second projector 52 disposed below the screen 400", toward the support layer 401, that is, the front side of the reconfigurable mobile device 1". The prism layer 407 may be formed as the same as or similar to the prism layer 407 of the screen 400 described in FIG. 19A; therefore, detailed description thereof is omitted.

The prism protective layer 408 may be provided on the bottom surface of the prism layer 407.

The parallax barrier layer 430 is provided on the top surface of the support layer 401, and is formed of a plurality of slits 431 that is arranged in a row.

The prism protective layer 408, the prism layer 407, the support layer 401, and the parallax barrier layer 430 as described above may be laminated in sequence, thereby forming the screen 400" that transmits the light projected from the first and second projectors 51 and 52 disposed below the screen 400".

If the controller 90 controls the first and second projectors 51 and 52 to alternatively project the left-eye image and the right-eye image onto the screen 400", the user can see the 3D image through the parallax barrier layer 430 of the screen 400".

As described above, the reconfigurable mobile device according to an embodiment of the present disclosure is configured of a body having a telescopic structure, a screen that is easy to be folded, and at least one projector to project an image onto the screen. Accordingly, when using the reconfigurable mobile device, the body is extended to create a full-size screen, and then the image is projected onto the full-size screen so that it is convenient to watch the image and to use the reconfigurable mobile device. Also, when not using the reconfigurable mobile device, a multistage supporter is inserted into the body so that the body is reduced in length, and both the screen and the projector are received inside the contracted body so that the size of the mobile device is downsized. Therefore, it is convenient to carry the reconfigurable mobile device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A reconfigurable mobile device comprising:
    a first body;
    a second body that is disposed at a side of the first body and is movable with respect to the first body;
    a multistage supporter that is provided between the first body and the second body and comprises at least two supporting members that are inserted and received in at least one of the first body and the second body according to movement of the first body and the second body;
    a screen that is provided in the multistage supporter and is wound or unwound according to the movement of the first body and the second body; and
    a projector that is provided in at least one of the first body and the second body and configured to project an image toward the screen.

2. The reconfigurable mobile device of claim 1, wherein half of the at least two supporting members constituting the multistage supporter is inserted in the first body, and the other half is inserted in the second body.

3. The reconfigurable mobile device of claim 1, wherein, when a side surface of the first body and a side surface of the second body are in contact with each other, the multistage supporter and the screen are not exposed to an outside, and when the first body is separated from the second body, the multistage supporter and the screen are exposed to the outside.

4. The reconfigurable mobile device of claim 1, wherein the projector is disposed above the screen.

5. The reconfigurable mobile device of claim 4, wherein the projector comprises a first projector to project an image onto a first portion of the screen, and a second projector to project an image onto a second portion of the screen.

6. The reconfigurable mobile device of claim 1, wherein the projector is disposed below the screen.

7. The reconfigurable mobile device of claim 1, wherein the first body is provided with a screen winding portion in which the screen is received in a wound state.

8. The reconfigurable mobile device of claim 1, wherein
    the first body is provided with a first screen winding portion in which half of the screen is wound and received, and
    the second body is provided with a second screen winding portion in which the other half of the screen is wound and received.

9. The reconfigurable mobile device of claim 1, wherein the screen comprises a support layer, a reflective layer, a tint layer, and an anti-reflective layer that are sequentially laminated.

10. The reconfigurable mobile device of claim 9, wherein the reflective layer comprises a plurality of inclined surfaces to reflect light projected from the projector.

11. The reconfigurable mobile device of claim 1, wherein the screen comprises a prism protective layer, a prism layer, a support layer, a tint layer, and an anti-reflective layer that are sequentially laminated.

12. The reconfigurable mobile device of claim 1, wherein the projector comprises:

a projecting portion to project light; and a reflective member to reflect the light coming out from the projecting portion to the screen.

13. The reconfigurable mobile device of claim 12, wherein the reflective member comprises an aspherical mirror.

14. The reconfigurable mobile device of claim 1, wherein the screen comprises a touch sensing layer.

15. The reconfigurable mobile device of claim 14, wherein the touch sensing layer comprises a transmission (Tx) electrode corresponding to a middle area of the screen, and four reception (Rx) electrodes provided at four sides of the Tx electrode.

16. The reconfigurable mobile device of claim 15, wherein the Tx electrode and the Rx electrodes are provided on a same side.

17. The reconfigurable mobile device of claim 15, wherein the touch sensing layer further comprises an Rx electrode provided in a middle of the Tx electrode.

18. The reconfigurable mobile device of claim 15, wherein a left Rx electrode of the touch sensing layer is disposed in the first body, and a right Rx electrode is disposed in the second body.

19. The reconfigurable mobile device of claim 1, further comprising:

a controller configured to adjust a size of the image that is projected by the projector according to a size of the screen that is exposed between the first body and the second body.

20. The reconfigurable mobile device of claim 6, wherein the screen comprises a prism protective layer, a prism layer, a support layer, and one of an aerial image (AI) plate layer, a lenticular layer, and a parallax barrier layer that are sequentially laminated.

* * * * *